US009847810B2

(12) United States Patent
Koifman et al.

(10) Patent No.: US 9,847,810 B2
(45) Date of Patent: Dec. 19, 2017

(54) ADD-ON APPARATUS FOR CHANNEL COMPENSATION OF FREQUENCY DIVERSITY COMMUNICATIONS AND METHODS USEFUL IN CONJUNCTION THEREWITH

(71) Applicant: Elta Systems Ltd., Ashdod (IL)

(72) Inventors: Gil Koifman, Petach-Tikva (IL); Yaakov Shoshan, Ashkelon (IL)

(73) Assignee: Elta Systems Ltd., Ashdod (IL)

( * ) Notice: Subject to any disclaimer, the term of this patent is extended or adjusted under 35 U.S.C. 154(b) by 0 days.

(21) Appl. No.: 14/892,323

(22) PCT Filed: May 20, 2014

(86) PCT No.: PCT/IL2014/050439
§ 371 (c)(1),
(2) Date: Nov. 19, 2015

(87) PCT Pub. No.: WO2014/188415
PCT Pub. Date: Nov. 27, 2014

(65) Prior Publication Data
US 2016/0099747 A1    Apr. 7, 2016

(30) Foreign Application Priority Data

May 23, 2013   (IL) .......................... 226510
Mar. 10, 2014  (IN) ......................... 680/DEL/2014

(51) Int. Cl.
*H04B 1/713* (2011.01)
*H04B 1/74* (2006.01)
*H04W 72/04* (2009.01)

(52) U.S. Cl.
CPC ............ *H04B 1/713* (2013.01); *H04B 1/74* (2013.01); *H04W 72/0406* (2013.01); *H04W 72/0453* (2013.01)

(58) Field of Classification Search
CPC ................................ H04B 1/713; H04B 1/74
(Continued)

(56) References Cited

U.S. PATENT DOCUMENTS 2,292,386 A    8/1942  Manson
4,475,243 A   10/1984  Batlivala et al.
(Continued)

FOREIGN PATENT DOCUMENTS

WO    2007/123733 A2    11/2007
WO    2010/132476 A2    11/2010
(Continued)

OTHER PUBLICATIONS

Torvmark, K.H., "Frequency Hopping Systems," Chipcon Products from Texas Instruments, Application Note AN014, <http://www.ti.com/lit/an/swra077/swra077.pdf>, pp. 1-7 (Dec. 31, 2002).

*Primary Examiner* — Michael Neff
(74) *Attorney, Agent, or Firm* — Mintz Levin Cohn Ferris Glovsky and Popeo, P.C.; Steven M. Jensen

(57) ABSTRACT

A communication system, typically wireless and comprising at least one wireless (say) communication network node having a capacity for communicating with at least one additional wireless (say) communication network node at a given center frequency; and at least one external frequency converter, external to the node, operative to cause at least one wireless (say) communication network node, from outside said node, to communicate with at least one additional wireless (say) communication network node, at least on occasion, according to a given e.g. wireless communication protocol, at at least one converted center frequency which differs from the given center frequency, wherein a Channel Compensation Signal (CCS) is employed.

28 Claims, 16 Drawing Sheets

(58) Field of Classification Search
USPC .......................................................... 375/132
See application file for complete search history.

(56) References Cited

U.S. PATENT DOCUMENTS

| | | | |
|---|---|---|---|
| 4,752,939 A | 6/1988 | Amoroso et al. | |
| 4,849,963 A | 7/1989 | Kawano et al. | |
| 4,941,200 A | 7/1990 | Leslie et al. | |
| 5,774,450 A | 6/1998 | Harada et al. | |
| 6,023,491 A * | 2/2000 | Saka | H04L 27/2273 |
| | | | 329/306 |
| 6,980,509 B1 | 12/2005 | Okada et al. | |
| 7,003,291 B2 | 2/2006 | Zhnag | |
| 7,231,197 B1 | 6/2007 | Fisher | |
| 7,711,029 B2 | 5/2010 | Guey | |
| 2002/0003773 A1 | 1/2002 | Okada et al. | |
| 2002/0034214 A1 | 3/2002 | Okada et al. | |
| 2003/0214919 A1 | 11/2003 | Kilfoyle et al. | |
| 2004/0264548 A1 | 12/2004 | Miyoshi | |
| 2005/0109917 A1 | 5/2005 | Wong | |
| 2005/0181799 A1 | 8/2005 | Laroia et al. | |
| 2006/0002288 A1 | 1/2006 | Okada et al. | |
| 2006/0198292 A1 | 9/2006 | Yoshii et al. | |
| 2006/0222054 A1 | 10/2006 | Conyers et al. | |
| 2006/0223468 A1 | 10/2006 | Toms et al. | |
| 2007/0177691 A1 | 8/2007 | Ruprich | |
| 2007/0254592 A1 | 11/2007 | McCallister et al. | |
| 2007/0259636 A1 | 11/2007 | Fisher | |
| 2008/0287081 A1 | 11/2008 | Van Dam et al. | |
| 2009/0109919 A1 | 4/2009 | Bertrand et al. | |
| 2009/0232071 A1 | 9/2009 | Cho et al. | |
| 2010/0048155 A1 | 2/2010 | Wang | |
| 2010/0074349 A1 | 3/2010 | Hyllander et al. | |
| 2010/0120397 A1 | 5/2010 | Kazmi et al. | |
| 2011/0081856 A1 | 4/2011 | Johansson et al. | |
| 2011/0150043 A1 | 6/2011 | Bergervoet et al. | |
| 2011/0207495 A1 | 8/2011 | Gerstenberger et al. | |
| 2011/0235743 A1 | 9/2011 | Lee et al. | |
| 2011/0286397 A1 | 11/2011 | Kim et al. | |
| 2012/0163333 A1 | 6/2012 | Arnott et al. | |
| 2012/0188919 A1 | 7/2012 | Subasic et al. | |
| 2012/0309299 A1 | 12/2012 | Kimura et al. | |
| 2013/0064314 A1 | 3/2013 | Ko et al. | |
| 2013/0094490 A1 | 4/2013 | Taromaru et al. | |
| 2013/0229939 A1 | 9/2013 | Teyeb et al. | |
| 2013/0287152 A1 | 10/2013 | Wu et al. | |
| 2013/0315320 A1 | 11/2013 | McGowan et al. | |

FOREIGN PATENT DOCUMENTS

| | | |
|---|---|---|
| WO | 2011/123696 A1 | 10/2011 |
| WO | 2012/036787 A2 | 3/2012 |
| WO | 2012/124917 A2 | 9/2012 |

* cited by examiner

[[add OFDMA TDD]]

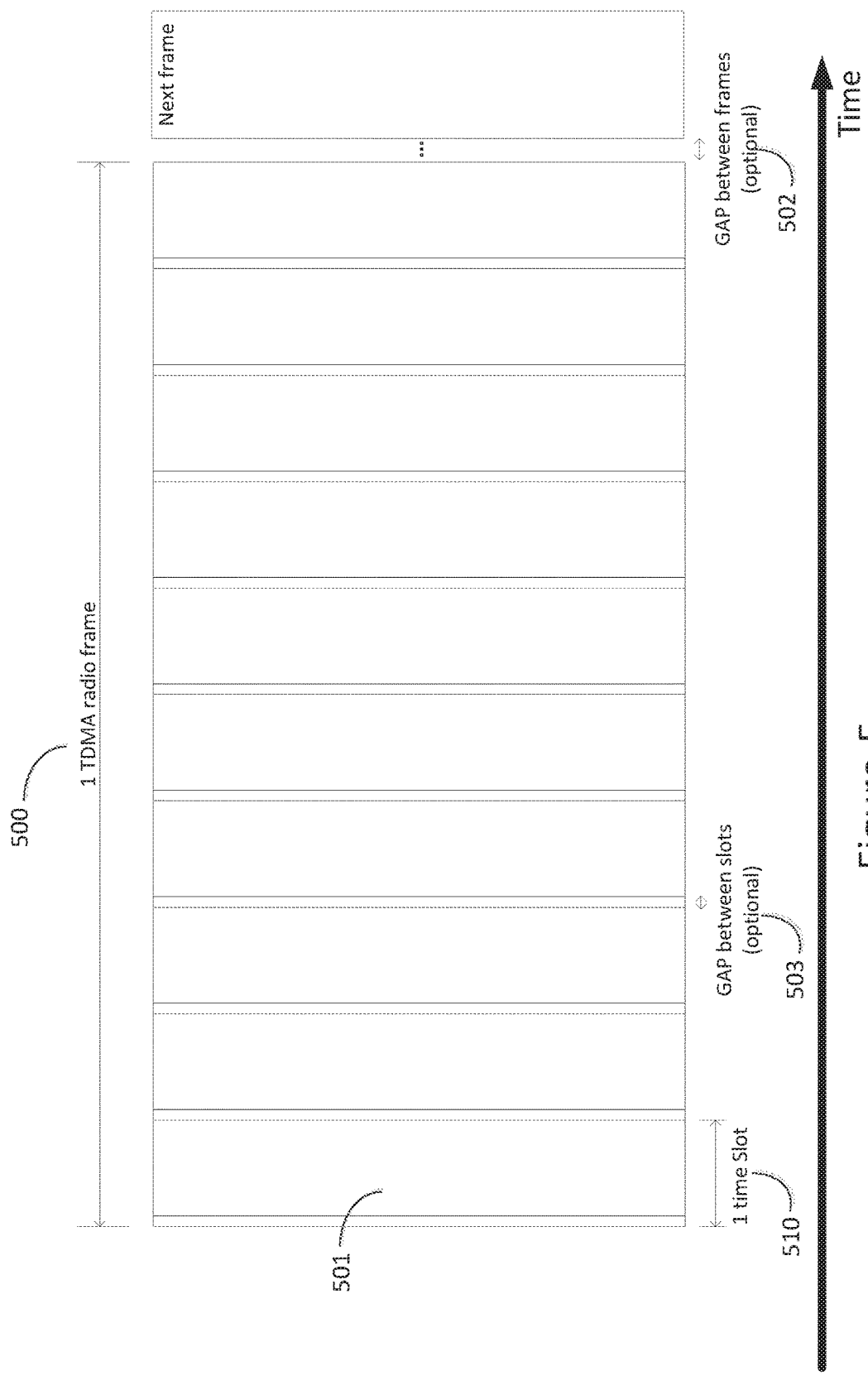

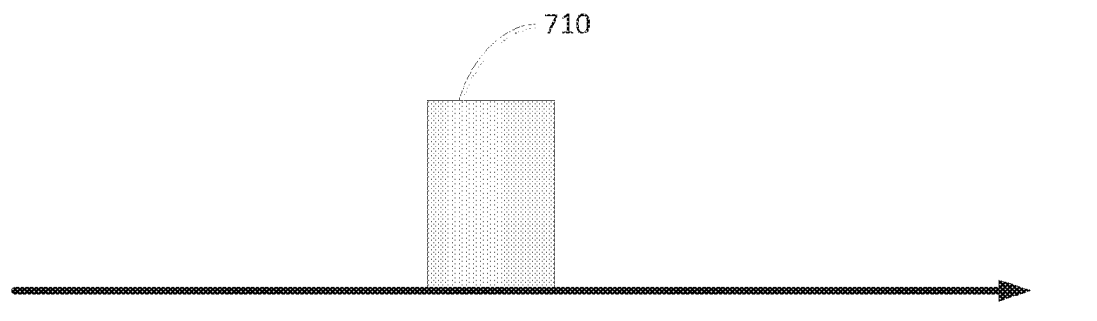
Figure-7a
(Prior art)
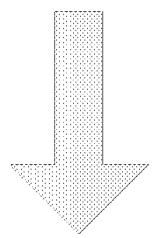
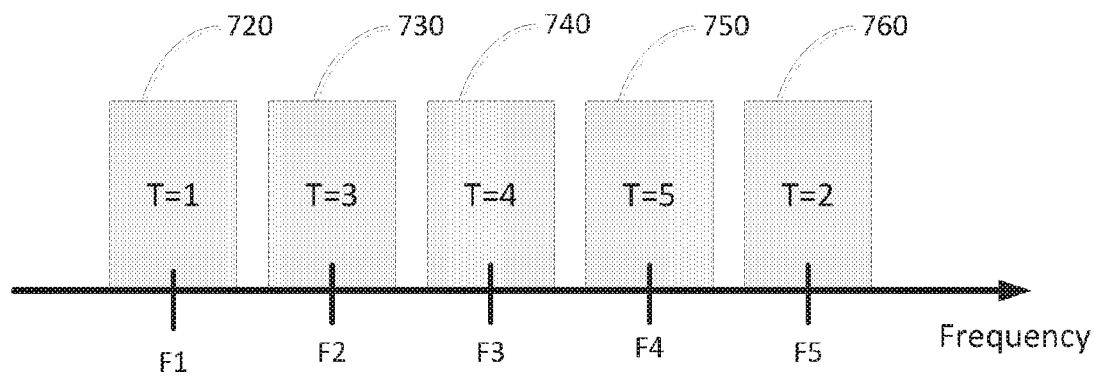
Figure-7b

ADD-ON APPARATUS FOR CHANNEL COMPENSATION OF FREQUENCY DIVERSITY COMMUNICATIONS AND METHODS USEFUL IN CONJUNCTION THEREWITH

REFERENCE TO CO-PENDING APPLICATIONS

This application claims priority from Israel Patent Application No. 226510, entitled: "Add-on Apparatus for Channel Compensation of Frequency Diversity Communications and Methods Useful In Conjunction Therewith" and filed 23 May 2013.

FIELD OF THE INVENTION

The present invention relates generally to wireless communication systems and more particularly to transmission and reception enhancement in wireless communication systems.

BACKGROUND OF THE INVENTION

Frequency diversity is a well known technique in the prior art that can be used for better channel adaptation and also for interference mitigation means. For example, in the next cellular standard after LTE, the LTE-Advanced, several carriers are used simultaneously for frequency diversity and also to achieve higher throughputs.

Frequency diversity is a known method for don't-put-all-your-eggs-in-one-basket motivated communications, since any individual fixed frequency may be plagued by noise, interference and so forth. Some protocols provide a certain level of frequency diversity which may or may not be sufficient for particular applications while others provide none.

Many communication systems typically use a fixed center frequency. For example, some wireless cellular communication systems such as 2G (CDMA) 3G (WCDMA) and 4G (WiMax, LTE) uses typically fixed center frequency for the communications within the cell. Sometimes all the cellular networks can be operated using a single fixed center frequency (in case of frequency reuse=1).

It is known that as a communication system moves from one center frequency to another, there is a transient time period which is prone to error, typically both at the transmitter end and at the receiver end, due to the "settling time" required by the hardware to adjust to the new frequency.

A variety of frequency converters are prevalent in the art.
Layer 1, 2 and 3 relays are known.
Many different communication protocols such as LTE, 3G UMTS, WiMAX, WiFi, OFDMA, CDMA and TDMA are known.

Receivers which recognize elements of a known protocol, such as cyclic prefixes, are known.

The disclosures of all publications and patent documents mentioned in the specification, and of the publications and patent documents cited therein directly or indirectly, and of specifications of mentioned protocols are hereby incorporated by reference.

SUMMARY OF THE INVENTION

In accordance with an aspect of the invention there is provided a wireless communication system comprising at least one wireless communication network node having a capacity for communicating with at least one additional wireless communication network node at a given center frequency; and at least one external frequency converter, external to the node, operative to cause at least one wireless communication network node, from outside said node, to communicate with at least one additional wireless communication network node, at least on occasion, according to a given wireless communication protocol, at at least one converted center frequency which differs from the given center frequency, wherein a Channel Compensation Signal (CCS) is employed.

In accordance with an embodiment of the invention there is further provided a system wherein the node comprises a base station.

In accordance with an embodiment of the invention there is further provided a a system wherein the node comprises a mobile station.

In accordance with an embodiment of the invention there is yet further provided a system wherein the capacity for communicating comprises a transmitting capacity and wherein the converter comprises a Tx frequency converter.

In accordance with an embodiment of the invention there is yet further provided a system wherein the capacity for communicating comprises a receiving capacity and wherein the converter comprises an Rx frequency converter.

In accordance with an embodiment of the invention there is yet further provided a system wherein the wireless communication protocol comprises LTE.

In accordance with an embodiment of the invention there is yet further provided a system wherein the wireless communication protocol comprises WiMax.

In accordance with an embodiment of the invention there is yet further provided a system wherein the wireless communication protocol comprises a 3G cellular communication protocol.

In accordance with an aspect of the invention there is yet further provided a wireless communication method comprising providing at least one existing wireless communication network node having a capacity for communicating with at least one additional cellular communication network node at a given center frequency; and retrofitting at least one external frequency converter onto the at least one existing node externally, wherein the converter is operative to cause the at least one existing wireless communication network node, from outside the existing node, to communicate with at least one additional wireless communication network node, at least on occasion, according to a given wireless communication protocol, at at least one converted center frequency which differs from the given center frequency, wherein a Channel Compensation Signal (CCS) is employed.

In accordance with an aspect of the invention there is further provided a wireless communication system comprising at least one wireless communication network node having a capacity for communicating with at least one additional wireless communication network node at a given center frequency and according to a given wireless communication protocol; and at least one external frequency converter, external to the node, the converter shifting the transmitted signal of the at least one wireless network node from the given center frequency to a first alternative center frequency, wherein the first alternative center frequency being changed from time to time during the communication between the at least one wireless communication network node and the at least one additional wireless communication network node; and wherein the external frequency converter is operative to transmit a channel compensation signal at a second alternative center frequency, in addition to the transmission of the communication protocol at the first alternative center frequency, wherein the second alternative center frequency is equal to the first alternative center frequency to be used on the next frequency change, wherein a Channel Compensation Signal (CCS) is employed.

In accordance with an embodiment of the invention there is yet further provided a system wherein the channel compensation carries information of the frequency to be used when the upcoming frequency change occurs.

In accordance with an embodiment of the invention there is yet further provided a system wherein the channel compensation signal spans over several future instances of the first alternative center frequency thus constitutes a wideband signal.

In accordance with an embodiment of the invention there is yet further provided a system wherein the external frequency converter comprises a channel compensation signal generator operative to generate the channel compensation signal.

In accordance with an embodiment of the invention there is yet further provided a system wherein the channel compensation signal is supplied to the external frequency converter from an external system.

In accordance with an embodiment of the invention there is yet further provided a system wherein the Transmit Frequency Converter (TFC) transmits the channel compensation, regardless of where it came from.

In accordance with an embodiment of the invention there is yet further provided a system wherein the channel compensation is generated by a component inside the Transmit Frequency Converter (TFC).

In accordance with an embodiment of the invention there is yet further provided a system wherein the channel compensation signal is transmitted continuously whenever the communication protocol is transmitted.

In accordance with an embodiment of the invention there is yet further provided a system wherein the channel compensation signal is transmitted only during partial intervals of the transmission of the communication protocol.

In accordance with an embodiment of the invention there is yet further provided a system wherein the channel compensation signal spans over the whole frequency bandwidth as of the communication protocol.

In accordance with an embodiment of the invention there is yet further provided a system wherein the channel compensation signal spans over only partial frequency bandwidth as of the communication protocol.

In accordance with an embodiment of the invention there is yet further provided a system wherein the channel compensation signal is a band limited White Gaussian Noise (WGN) signal.

In accordance with an embodiment of the invention there is yet further provided a system wherein the channel compensation signal is a predetermined signal.

In accordance with an embodiment of the invention there is yet further provided a system wherein the channel compensation signal is a multi-tone signal.

In accordance with an embodiment of the invention there is yet further provided a system wherein the channel compensation signal comprises multiple frequency tones.

In accordance with an embodiment of the invention there is yet further provided a system wherein the channel compensation signal is transmitted periodically.

In accordance with an embodiment of the invention there is yet further provided a system wherein the external frequency converter comprises a synchronization detector, operative to detect a predetermined portion of the signal of the communication protocol, and to synchronize the change in the first and second alternative center frequencies during the detected portion of the signal.

In accordance with an embodiment of the invention there is yet further provided a system wherein the communication protocol comprises LTE cellular communication protocol.

In accordance with an embodiment of the invention there is yet further provided a system wherein the communication protocol comprises 3G cellular communication protocol.

In accordance with an embodiment of the invention there is yet further provided a system wherein the communication protocol comprises WiMAX cellular communication protocol.

In accordance with an embodiment of the invention there is yet further provided a system wherein the communication protocol comprises OFDM communication protocol.

In accordance with an embodiment of the invention there is yet further provided a system wherein the communication protocol comprises OFDMA communication protocol.

In accordance with an embodiment of the invention there is yet further provided a system wherein the predetermined portion is a Cyclic Prefix of an OFDM symbol.

In accordance with an embodiment of the invention there is yet further provided a system wherein the predetermined portion is a Cyclic Prefix of an OFDMA symbol.

In accordance with an embodiment of the invention there is yet further provided a system wherein the predetermined portion is a GAP between successive frames of the communication protocol.

In accordance with an embodiment of the invention there is yet further provided a system wherein the communication protocol is a TDD protocol, and wherein the predetermined portion is a GAP between the uplink subframe and the downlink subframe of the communication protocol.

In accordance with an aspect of the invention there is yet further provided a wireless communication system operative for channel compensation signal as WIDEBAND over all frequencies and comprising at least one wireless communication network node having a capacity for communicating with at least one additional wireless communication network node at a given center frequency and according to a given wireless communication protocol; and at least one external frequency converter, external to the node, the converter shifting the transmitted signal of the at least one wireless network node from the given center frequency to a first alternative center frequency, wherein the first alternative center frequency being changed from time to time during the communication between the at least one wireless communication network node and the at least one additional wireless communication network node; and wherein the external frequency converter is operative to transmit a channel compensation signal at a second alternative center frequency, in addition to the transmission of the communication protocol at the first alternative center frequency, wherein the second alternative center frequency is a predetermined frequency, and wherein the channel compensation signal bandwidth spans over the frequencies of at least a multiple of the first alternative center frequencies as changed along the time, wherein a Channel Compensation Signal (CCS) is employed.

In accordance with an embodiment of the invention there is yet further provided a system wherein the channel compensation signal bandwidth spans over all the possible frequencies of the changing first alternative center frequency.

In accordance with an embodiment of the invention there is yet further provided apparatus in which the above features are provided, mutates mutandis, at the receiver end rather than at the transmitter end.

Certain embodiments seek to provide an add-on (external to the transmitter and receiver) apparatus and relevant methods, that enable the addition of frequency diversity ability to communication systems not having such ability.

When using frequency diversity techniques, supporting several concurrent channels is difficult because, in order to do so, one needs to have multi-channel hardware in both ends (transmitter and receiver), which is difficult to implementing, especially at the handset (mobile station) side.

Addition of frequency diversity to systems having fixed center frequency can provide such systems with great advantage, as described above.

Addition of frequency diversity ability inside existing equipment (off-the-shelf) is usually complex and costly. An external apparatus, however, may allow using various types of off-the-shelf equipment (without any development efforts) from different equipment suppliers.

There is thus provided, in accordance with certain embodiments, a cellular communication system comprising at least one cellular communication network node having a capacity for communicating with at least one additional cellular communication network node at a given center frequency; and at least one external frequency converter, external to said node, operative to cause at least one cellular communication network node, from outside said node, to communicate with at least one additional cellular communication network node, at least on occasion, according to a given cellular communication protocol, at at least one converted center frequency which differs from said given center frequency.

The node may comprise a base station and/or a mobile station.

Further in accordance with certain embodiments, the capacity for communicating comprises a transmitting capacity and the converter comprises a Tx frequency converter.

Still further in accordance with certain embodiments, the capacity for communicating comprises a receiving capacity and the converter comprises an Rx frequency converter.

Additionally in accordance with certain embodiments, the cellular communication protocol comprises LTE, WiMax or a 3G cellular communication protocol, inter alia.

Also provided, in accordance with certain embodiments, is a cellular communication method comprising providing at least one existing cellular communication network node having a capacity for communicating with at least one additional cellular communication network node at a given center frequency; and retrofitting at least one external frequency converter onto said at least one existing node externally, wherein said converter is operative to cause said at least one existing cellular communication network node, from outside said existing node, to communicate with at least one additional cellular communication network node, at least on occasion, according to a given cellular communication protocol, at at least one converted center frequency which differs from said given center frequency.

Embodiments of the present invention also include:

Embodiment 1

A wireless communication system comprising:
at least one wireless communication network node having a capacity for communicating with at least one additional wireless communication network node at a given center frequency and according to a given wireless communication protocol; and at least one external frequency converter, external to said node, said converter shifting the received signal of said at least one wireless network node from a first alternative center frequency to said given center frequency, wherein said first alternative center frequency being changed from time to time during the communication between said at least one wireless communication network node and said at least one additional wireless communication network node; and wherein said external frequency converter is operative to receive a channel compensation signal at a second alternative center frequency;
wherein said second alternative center frequency is equal to the first alternative center frequency to be used on the next frequency change;

Embodiment 2

A system according to Embodiment 1 wherein said external frequency converter comprises a channel compensation signal receiver operative to receive said channel compensation signal.

Embodiment 3

A system according to Embodiment 1 wherein said channel compensation signal is received continuously whenever said communication protocol is received.

Embodiment 4

A system according to Embodiment 1, but for wideband Channel Compensation Signal (CCS) signal e.g. as recited herein in transmitter claim 46.

Embodiment 5

A system according to any of the preceding Embodiments and also including a channel equalization block e.g. 980 which equalizes the channel based on measurements made by receiver e.g. 960 based on the ccs signal.

BRIEF DESCRIPTION OF THE DRAWINGS

Certain embodiments of the present invention are illustrated in the following drawings:

FIG. 2b depicts a further alternative to the embodiment of FIG. 2a.

FIG. 5 depicts a TDMA radio frame, in a TDMA communication system implementing add-on frequency diversity according to certain embodiments of the invention.

FIGS. 7a-7b are simplified illustrations of the frequency behavior effect when using the add-on frequency diversity apparatuses (RFC+TFC). In particular, FIG. 7a shows the system before using the RFC+TFC and FIG. 7b shows the same system after using the RFC+TFC.

Computational components described and illustrated herein can be implemented in various forms, for example, as hardware circuits such as but not limited to custom VLSI circuits or gate arrays or programmable hardware devices such as but not limited to FPGAs, or as software program code stored on at least one intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Data can be stored on one or more intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include any apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

Figure 1A:
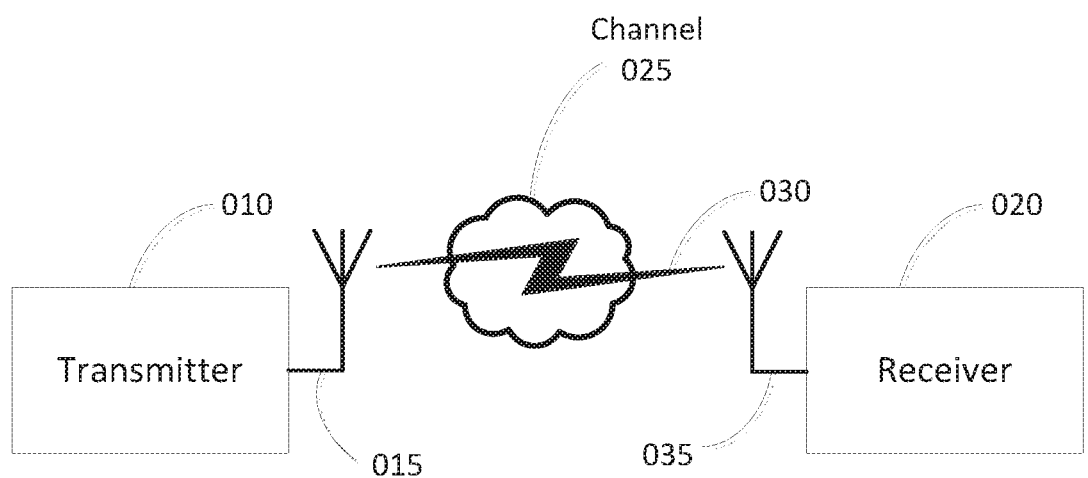
FIG. 1a (Prior Art) depicts a typical wireless communication system comprising a transmitter and a receiver.

FIG. 1a (Prior Art) depicts a typical wireless communication system comprising a transmitter 010 having a transmitting antenna 015, which transmits a wireless signal 030 through a channel 025. The wireless signal is then received using a receiving antenna 035 by a receiver 020.

Figure 1B:
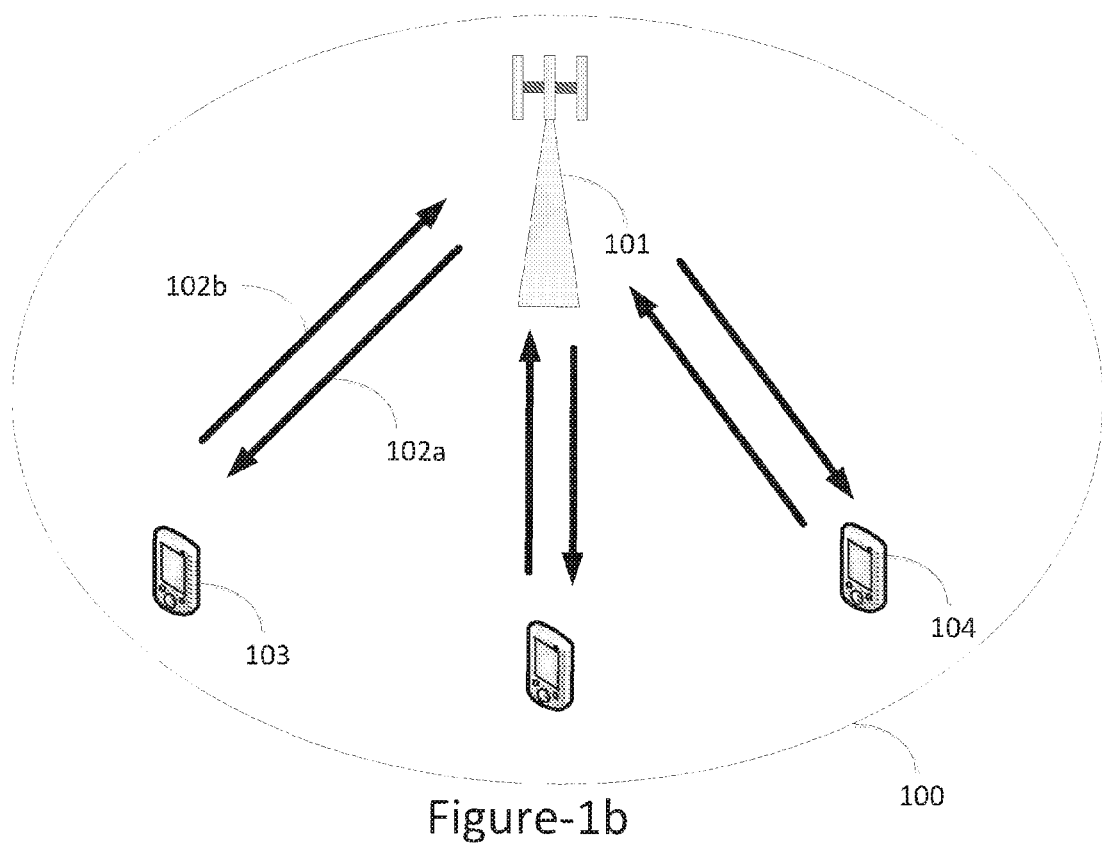
FIG. 1b depicts a typical cell or other network portion in a wireless e.g. cellular communication system.

FIG. 1b depicts a typical cell or other network portion in a wireless e.g. cellular communication system.

This embodiment typically includes a typical cell or other network portion 100 in a wireless e.g. cellular communication system. A base station 101 transmits and receives signals to and from a plurality of mobile stations within its geographical coverage area. Such mobile stations are noted as 103 and 104. Each mobile station transmits an Uplink signal 102b to base station 101, and receives a Downlink signal 102a from base station 101. The communication system may be a cellular system, or alternatively any other wireless network.

The wireless communication system may implement one of the cellular standards, one of the wireless communication standards, or may implement some proprietary communication signals and protocols. For example, a cellular communication system may implement the 3GPP LTE standard, the WiMAX standard, the 3GPP WCDMA, HSPA or any other cellular standard. As a further example, the wireless communication system may implement one of the 802.11 WiFi standards.

Downlink 102a and Uplink 102b signals may be transmitted using TDMA, CDMA, FDMA, OFDMA, or any other method or combination of methods.

Figure 1C:
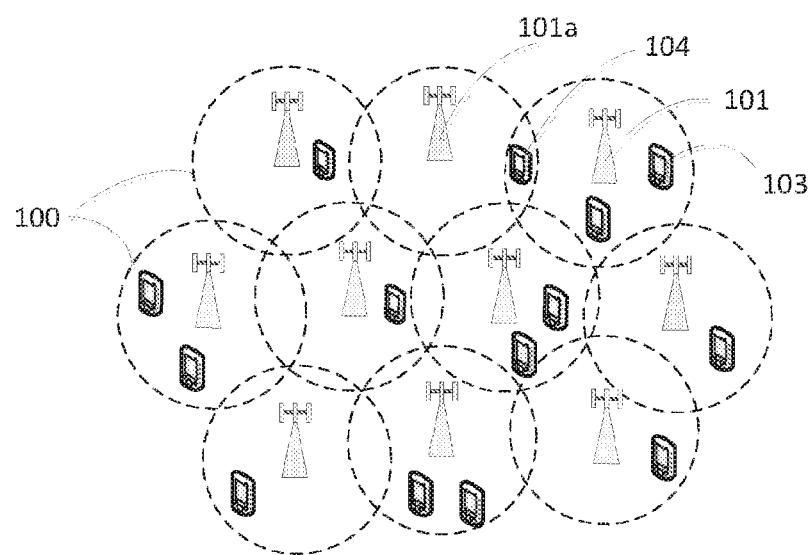
FIG. 1c depicts a cellular system comprising a plurality of cells; each of the cells e.g. as described above with reference to FIG. 1b.

FIG. 1c depicts a cellular system comprising a plurality of cells; each of the cells e.g. as described above with reference to FIG. 1b.

This embodiment typically includes a cellular system comprising a plurality of cells 100, each of which is described above regarding FIG. 1b. Some of the mobile stations may receive the downlink signals from their serving base stations in low quality. Such low quality signals may be caused by multipath, fading, inter-cell interferences, attenuation, or any other cause or combination of such. In such conditions, it is difficult for the mobile station to maintain proper reception of the downlink signals from the base station.

For example, in one of the cells, base station 101 serves the mobile stations 103 and 104, amongst other mobile stations. Mobile station 104 also resides within the geographical coverage area of base station 101a; therefore Mobile station 104 receives downlink signals from 2 base stations 101 and 101a, which causes lower quality reception of the desired downlink signal from base station 101.

Typically, in a cellular or wireless communication system, some of the downlink transmissions may include portions which are more critical than other portions. Such critical portions are referred to as "Critical Regions" herein below.

One example of a Critical Region is downlink synchronization signals, which are critical for the proper reception of the remaining downlink transmission. Another example is control and management messages, such as but not limited to, for example, the DL-MAP signal in WiMAX, the PDCCH signal in LTE and CCPCH signal in 3G UMTS, that the base station sends to the mobile stations; such control and management messages may be critical for proper reception of the downlink transmission.

Another example of a Critical Region is a portion of a downlink signal addressed to a mobile station which receives the downlink transmission in low quality, as described above. Another example is a portion of a downlink signal addressed to a mobile station which is a preferred mobile station (e.g. has greater importance or higher priority over the other mobile stations).

Such Critical Regions may vary from time to time, or from frame to frame. Such variations may be for example in the content (information) carried by the critical region, or in the critical region allocation within the frame.

Alternatively, the Critical Regions may be fixed, either by their content or by their allocation. Further alternatively, they may vary slowly, for example be fixed for several consecutive frames, and then be changed.

Figure 6:
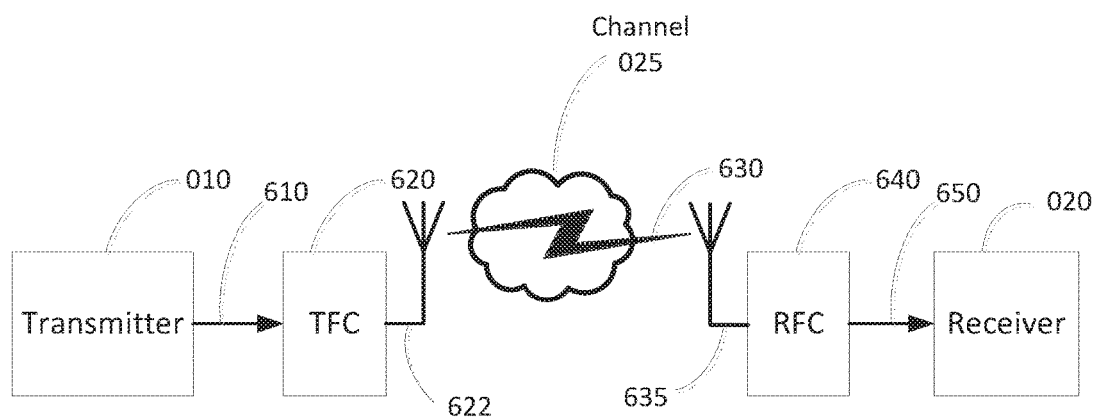
FIG. 6 depicts a wireless communication system incorporating add-on frequency diversity couple apparatuses at the transmitter side (TFC) and at the receiver side (RFC).

FIG. 6 depicts a wireless communication system incorporating add-on frequency diversity couple apparatuses at the transmitter 010 side (Transmit Frequency Converter (TFC) 620) and at the receiver 020 side (Receive Frequency Converter (RFC) 640) according to an embodiment of the present invention. Transmitter 010 resides in a wireless communication network node, e.g. 101, 103 or 104 of FIG. 1b. Receiver 020 resides in an additional wireless communication network node. For example, transmitter 010 may reside in mobile node 103 and receiver 020 may reside in base station 101. Typically, transmitter 010 has the capacity to communicate with receiver 020 over channel 025 according to a given communication protocol, e.g. LTE, WiMAX, WiFi, 3G cellular, Bluetooth, etc. The communication protocol may optionally be, say, an OFDM, OFDMA, CDMA, TDMA, FDMA protocol. Typically, transmitter 010 has the capacity to communicate with receiver 020 at a given ("original") center frequency.

At the transmitter side a Transmit Frequency Converter (TFC) 620 is added. The interface 610 between the transmitter 010 and the Transmit Frequency Converter (TFC) 620 may be optionally at the RF frequency (e.g. the prior antenna interface at high power or at the RF frequency at low power before the power amplifier). Optionally it may be implemented at the IF (intermediate frequency). Optionally it may be implemented at the base-band. At the receiver side, a Receive Frequency Converter (RFC) 640 is added. Accordingly the interface between the Receive Frequency Converter (RFC) 640 and the receiver 020 may be optionally in all the alternatives as described above regarding the Transmit Frequency Converter (TFC) 620. The main function of the Transmit Frequency Converter (TFC) is to convert the original center frequency of the signal transmitted by the transmitter 010 to a shifted center frequency (also referred to as "alternative center frequency"). The Transmit Frequency Converter (TFC) 620 is then connected to a transmitting antenna 622 that covers all the shifted frequencies that are implemented by the Transmit Frequency Converter (TFC). Optionally, additional components may be added between the Transmit Frequency Converter (TFC) and the antenna, e.g. a PA (Power Amplifier) and filters. In a similar manner, the receiving antenna 635 also covers all the shifted frequencies and then it is interfaced to the Receive Frequency Converter (RFC) 640 which re-converts the shifted center frequency to the original center frequency. Thereafter, the signal 650 which has the original center frequency is received correctly by the receiver 020. Optionally, additional components may be added between the Receive Frequency Converter (RFC) and the antenna, e.g. a LNA (Low Noise Amplifier) and filters.

Typically, Transmitter 010 and Receiver 020 are standard apparatuses, and may be off-the-shelf equipment capable to communicate with each other. Typically, the frequency conversion (shift) varies with time, such that a different frequency shift is performed by the Transmit Frequency Converter (TFC) and Receive Frequency Converter (RFC) along with time, e.g. the alternative center frequency is changed from time to time during the communication between the receiver 020 and the transmitter 010. Optionally, a new frequency shift is performed periodically every predetermined time interval. Optionally, a new frequency shift is performed non-periodically, according to a predetermined control. Optionally, a new frequency shift is performed during non-critical regions of the transmission, thus minimizing the interference and the degradation to the received transmission. Examples for placing a frequency shift at non critical regions of the transmission is further described regarding FIGS. 2-5 below.

Optionally, the frequency shift is taken from a predetermined set e.g. list of frequency shifts. Further optionally, the frequency shift is selected consecutively from said list. Alternatively, the frequency shift is taken or configured from an external system. Alternatively, the frequency shift is computed according to a predetermined algorithm.

FIGS. 7a-7b are simplified illustrations of the frequency behavior effect when using the add-on frequency diversity apparatuses (RFC+TFC). FIG. 7a (Prior art) shows a situation before using the RFC+TFC. It may be seen that the original center frequency 710 is static in the frequency domain.

FIG. 7b shows the situation after using the RFC+TFC, according to an embodiment of the present invention. It illustrates an example of the shifted center frequencies. It may be seen that the shifted center frequency is shifted to different center frequencies along with time. In time period=1 (T=1) 720 the shifted center frequency is F1. In time period=2 (T=2) 760 the shifted center frequency is F5. In time period=3 (T=3) 730 the shifted center frequency is F2. In time period=4 (T=4) 740 the shifted center frequency is F3. In time period=5 (T=5) 750 the shifted center frequency is F4.

Figure 2A:
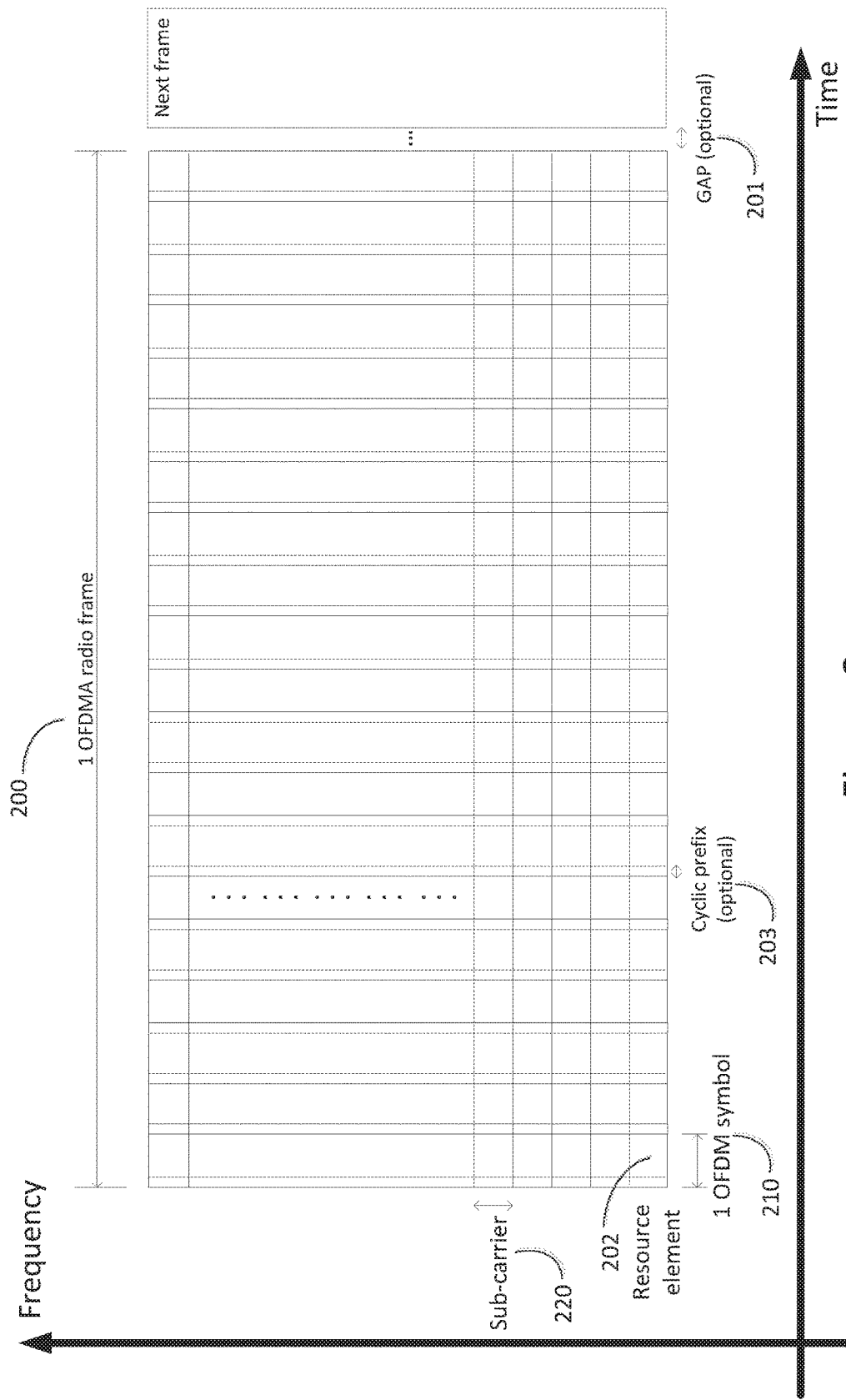
FIG. 2a depicts an OFDMA radio frame (either downlink or uplink), in an OFDMA FDD communication system implementing add-on frequency diversity according to certain embodiments of the invention.
Figure 2B:
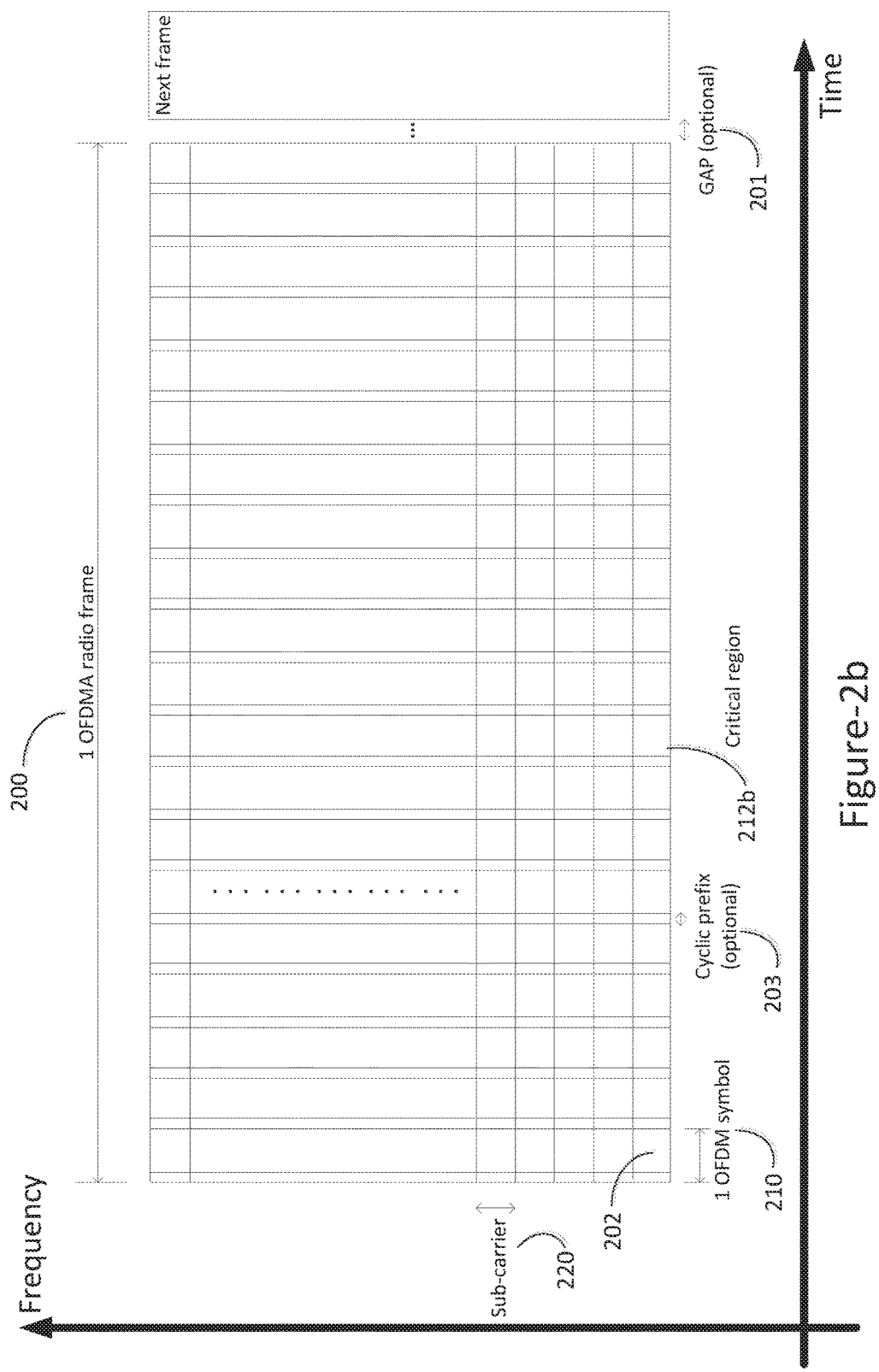

FIG. 2a depicts an OFDMA/OFDM radio frame 200 (either downlink or uplink), in an OFDMA FDD communication system implementing add-on frequency diversity according to certain embodiments of the invention.

This embodiment typically includes an OFDMA (or OFDM) radio downlink frame 200, in an OFDMA (or OFDM) communication system. Frame 200 comprises a plurality of OFDM symbols 210 in the time domain, and a plurality of subcarriers 220 in the frequency domain. An optional Gap 201 may be placed between successive frames 200. An optional Cyclic Prefix 203 may be provided between successive OFDM symbols in the time domain. A basic resource which may be allocated in the downlink transmission frame is resource element 202, which is the transmission of one subcarrier during one OFDM symbol length in time.

In the OFDMA (or OFDM) frame 200 there are several locations (in the time domain) that the frequency conversion/shift, e.g. as described above with reference to FIGS. 6-7, may be realized. Each of these locations implements different frequency shift rates. For example, the frequency shift may be performed during the cyclic prefix (CP) 203 of an OFDM/OFDMA symbol 210. It may be performed during the CP of every symbol or during the CP of every several symbols. Alternatively, the frequency shift may be done during un-important symbol duration (or during empty symbol—a symbol time that no data is transmitted). Alternatively, it may be done during the time gap 201 between consecutive frames. Each of the above examples may be regarded as a "non-critical region" of the transmission, in that improper reception of these regions is not as harmful to the receiver as other (critical) regions.

In another embodiment of the present invention which includes an OFDMA radio frame, in an OFDMA TDD (Time Division Duplex) communication system implements add-on frequency diversity according to certain embodiments of the invention. In the TDD system, both DL (downlink) and UL (uplink) frames occupy the same frequency (center frequency) and are transmitted alternately. Between each one of these two frames there are guard gaps (between DL and UL, and between UL and DL). In each one of these guard gaps the frequency conversion/shift realizing the frequency diversity may be realized. In this implementation, the rate of the conversions is therefore the frames' shift rate. Typically, all locations in the frame described in FIG. 2a may also be used in the TDD system.

Figure 3A:
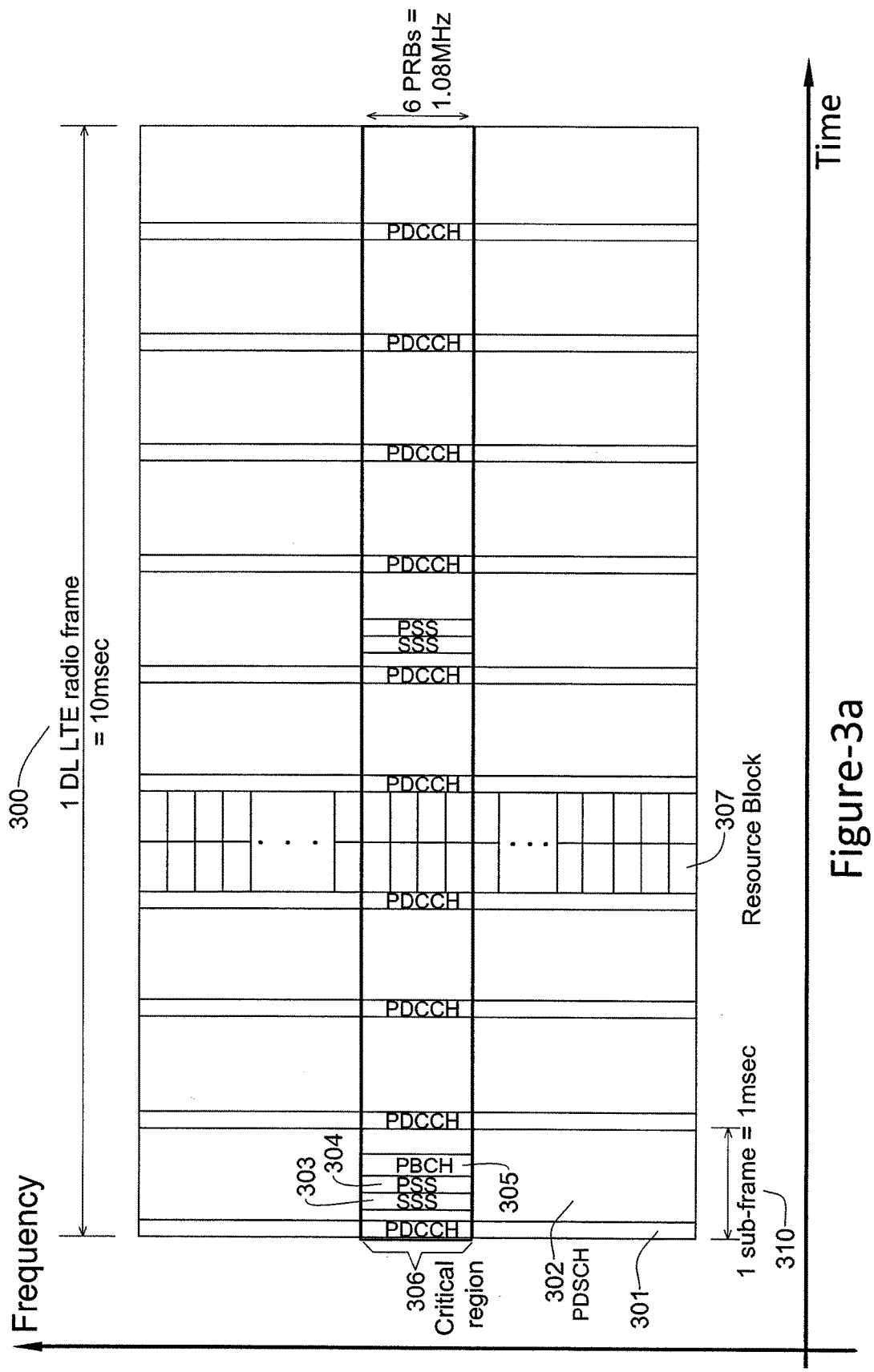
FIG. 3a depicts an LTE FDD radio frame (either downlink or uplink) implementing add-on frequency diversity according to embodiments of the invention.

FIG. 3a depicts LTE FDD radio frame (either downlink or uplink) implementing add-on frequency diversity according to embodiments of the invention. The embodiment of FIG. 3a illustrates an LTE radio downlink (DL) frame 300 which has a duration of, say, 10 msec, in an LTE cellular communication system. Frame 300 comprises a plurality of LTE physical resource blocks (PRBs) 307 which may be a subset of 6 OFDMA symbols in time and 12 sub-carriers in frequency. The DL (downlink) frame also comprises LTE sub-frames such as that shown at reference numeral 310 (its duration is, say, 1 msec). The LTE DL (downlink) frame in the illustrated embodiment, is of the FDD (Frequency Division Duplex) type, however TDD (Time Division Duplex) type of DL (downlink) frames may be employed similarly.

As shown, the LTE DL (downlink) frame includes several physical channels or signals e.g. some or all of: Physical DL (downlink) Control Channel (PDCCH) 301, Physical DL (downlink) Shared Channel (PDSCH) 302, Secondary Synchronization Signal (SSS) 303, Primary Synchronization Signal (PSS) 304 and Physical Broadcast Channel (PBCH) 305. Each of these channels or signals or any subset thereof may be deemed critical to LTE system operation.

Since LTE FDD is OFDMA then the locations for the frequency shift in the frame that were described above regarding FIG. 2a may also be used in the LTE FDD system.

A further embodiment of the present invention includes an LTE TDD radio frame implementing add-on frequency diversity. Since LTE TDD is OFDMA then all the locations for the frequency shift in the frame that were described above regarding OFDMA TDD may also be used in here in the LTE TDD system.

Figure 4A:
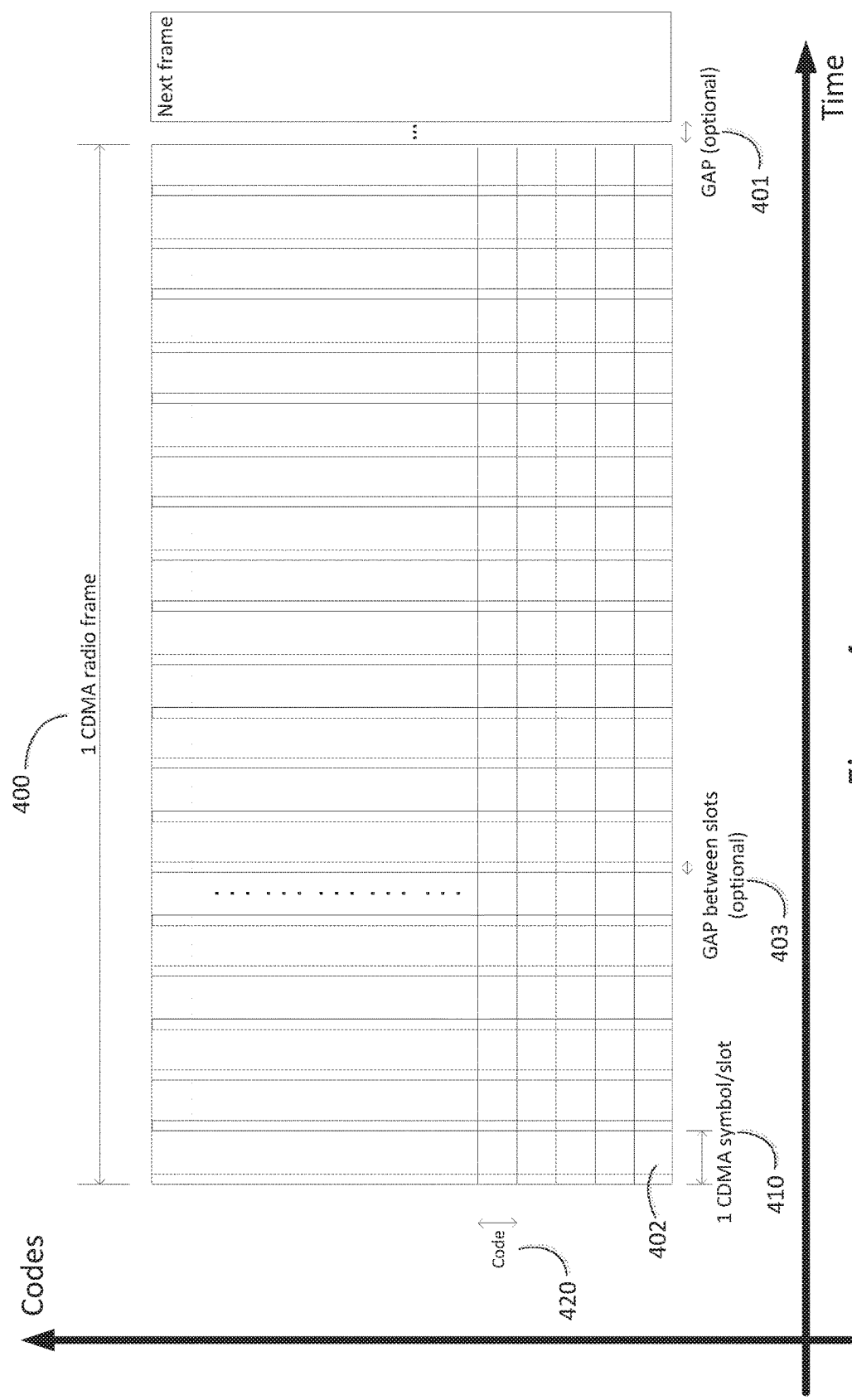
FIG. 4a depicts a CDMA FDD radio frame (either downlink or uplink), in a CDMA communication system implementing add-on frequency diversity according to certain embodiments of the invention.

FIG. 4a depicts a CDMA FDD radio frame (either downlink or uplink), in a CDMA communication system implementing add-on frequency diversity according to certain embodiments of the invention. In the CDMA frame 400 there are several locations (in the time domain) that the frequency conversion/shift may be realized. Each of these locations implements different frequency shift rates. For example, the frequency shift may be inserted during the gap between slots/symbols 403 of a CDMA symbol/slot 410. It may be inserted every symbol/slot, or every several symbols/slots. Alternatively, the frequency shift may be inserted during un-important symbol/slot duration (or during empty symbol/slot—a symbol/slot time that no data is transmitted). Alternatively, it may be inserted during the time gap 401 between consecutive frames. Each of the above examples may be regarded as a "non-critical region" of the transmission, in that improper reception of these regions is not as harmful to the receiver as other (critical) regions.

Another embodiment of the present invention includes a CDMA TDD radio frame, in a CDMA communication system implementing add-on frequency diversity according to certain embodiments of the invention. In the TDD system, both DL (downlink) and UL (uplink) frames occupy the same frequency (center frequency) and are transmitted alternately. Between each one of these two frames there are guard gaps (between DL and UL, and between UL and DL). In each one of these guard gaps the frequency conversion/shift realizing the frequency diversity may be inserted. In this implementation, the rate of the conversions is therefore the frames' shift rate. All locations in the frame that were described in FIG. 4a may likewise be used in the TDD system.

FIG. 5 depicts a TDMA radio frame, in a TDMA communication system implementing add-on frequency diversity according to certain embodiments of the invention. In the TDMA frame 500 there are several locations (in the time domain) that the frequency conversion/shift may be inserted. Each of these locations implements different frequency shift rates. For example, the frequency shift may be inserted during the gap between slots 503 of a TDMA symbol 510. It may be inserted every slot or every several slots. Alternatively, the frequency shift may be inserted during un-important slot duration (or during empty slot—a slot time that no data is transmitted). Alternatively it may be instered during the time gap 501 between consecutive frames. Each of the above examples may be regarded as a "non-critical region" of the transmission, in that improper reception of these regions is not as harmful to the receiver as other (critical) regions.

Figure 8:
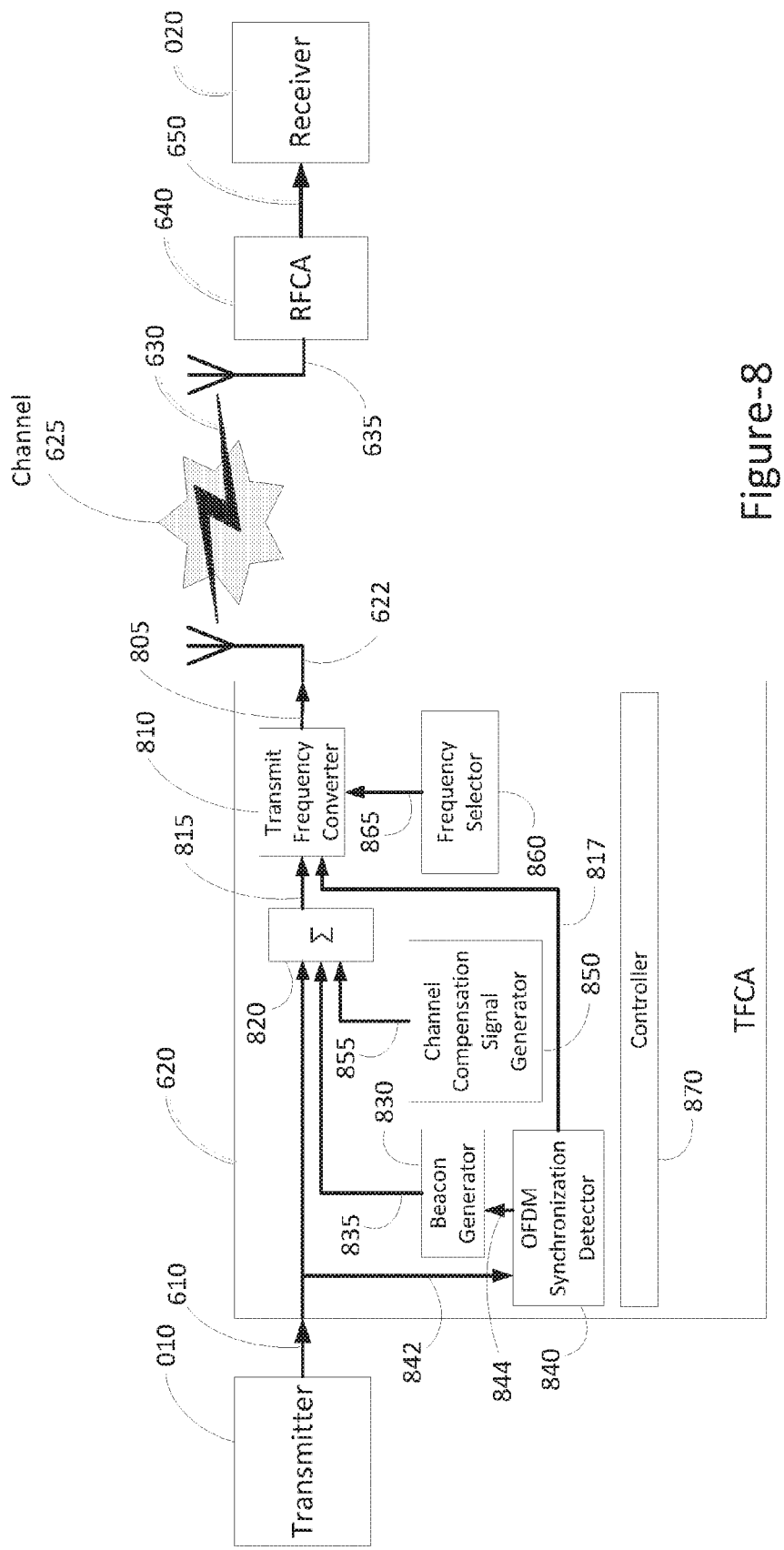
FIGS. 8, 9 are diagrams of systems useful for providing and/or utilizing Add-on Synchronization functionality for Frequency Diversity Communications, in accordance with certain embodiments.
Figure 13:
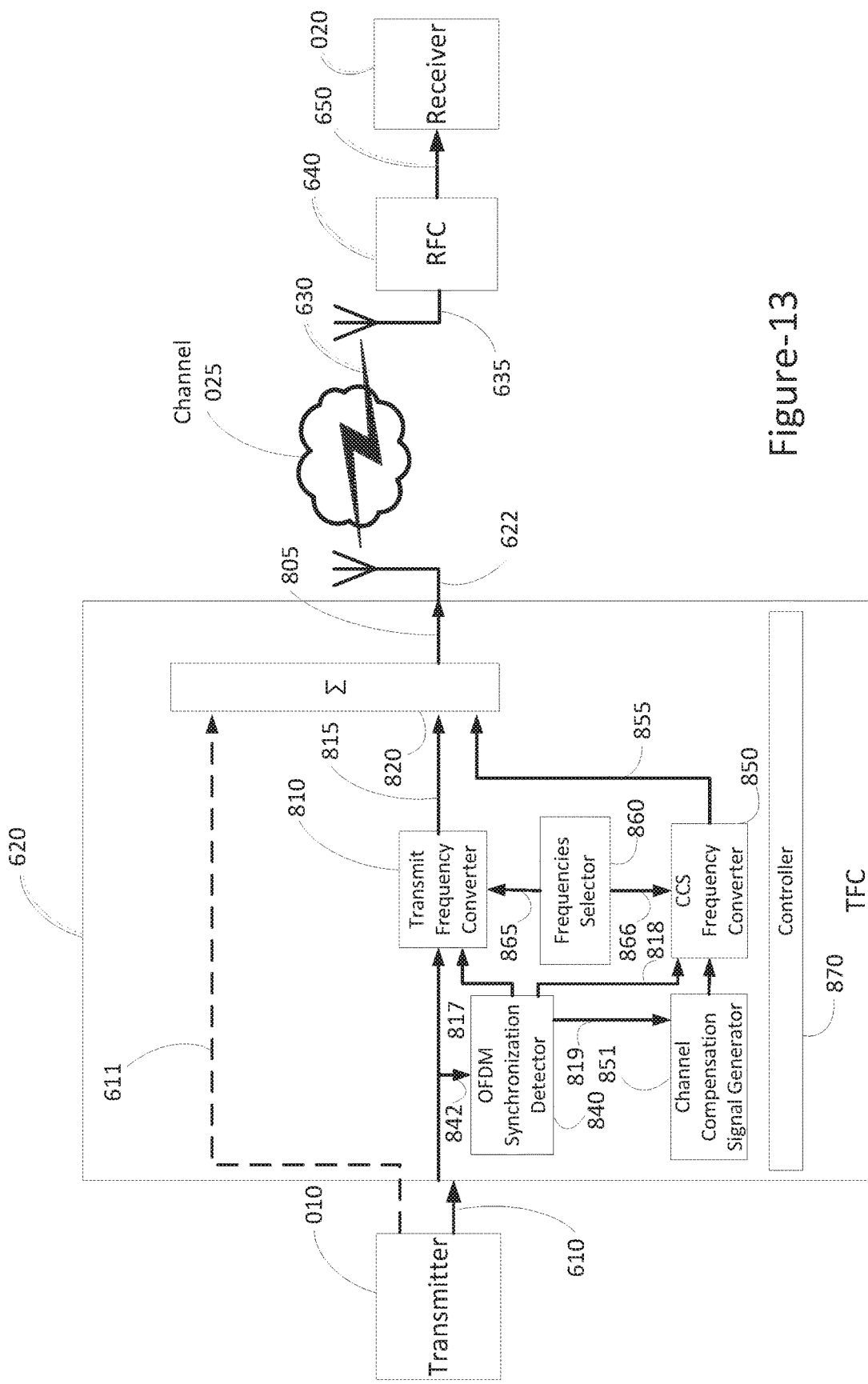
FIG. 13 is a block diagram of an example implementation of the Transmit Frequency Converter (TFC) portion of the add-on frequency diversity apparatus.

FIG. 13 depicts a more detailed block diagram of an example of the Transmit Frequency Converter (TFC) portion of the add-on frequency diversity apparatus, according to a further embodiment of the present invention. In this embodiment, Transmit Frequency Converter (TFC) 620 comprises a synchronization detector 840, a transmit frequency converter 810, and optionally a frequencies selector 860. In the case of an OFDM communication protocol, synchronization detector 840 is an OFDM synchronization detector, as depicted in FIG. 8a, operative to detect predetermined portions of the OFDM signal. Alternatively, in the case of a CDMA communication protocol, synchronization detector 840 is a CDMA synchronization detector, operative to detect predetermined portions of the CDMA signal. Alternatively, according to the communication protocol, synchronization detector 840 is operative to detect predetermined portions of the relevant communication protocol signal.

Typically, synchronization detector 840 is operative to detect predetermined portions of the relevant communication protocol signal in which the frequency conversion/shift may be realized, as described above regarding FIGS. 2-7. Typically, upon detection of said predetermined portion, the synchronization detector 840 synchronizes the transmit frequency converter 810 to perform a change in the alternative center frequency, e.g. to perform a change in the active frequency shift. Transmit frequency converter 810 is the actual component that performs the frequency conversion. The new alternative center frequency may optionally be determined by a frequency selector 860. Further optionally, a controller 870 resides in Transmit Frequency Converter (TFC) 620, for controlling the operation of its process. Optionally, the change in the alternative center frequency is made upon several consecutive detections of said predetermined portion. Further optionally, the change in the alternative center frequency is determined by some predefined criterion taking into account the detection of said predetermined portion.

Optionally and preferably, said predetermined portions of the signal, in which the frequency conversion/shift may be realized, are "non-critical regions" of the transmission, in that improper reception of these portions/regions is not as harmful to the receiver as other (critical) regions. Some examples of such portions/regions are described above regarding FIGS. 2-5, and also hereinbelow.

Some examples of the operation of the synchronization detector 840 are:
  a. In the case of a OFDM or OFDMA communication protocol, the synchronization detector 840 may be operative to detect the Cyclic Prefix (CP) of the OFDM/OFDMA symbols, and to synchronize the transmit frequency converter 810 to perform a change in the alternative center frequency during the transmission of the CP.
  b. In the case of a frame-based communication protocol, where a GAP or some guard period is placed between successive frames, the synchronization detector 840 may be operative to detect said GAP or guard period, and to synchronize the transmit frequency converter 810 to perform a change in the alternative center frequency during said GAP or guard period.
  c. In the case of a TDD communication protocol, where a GAP or some guard period is placed between the uplink subframe and the downlink subframe, the synchronization detector 840 may be operative to detect said GAP or guard period, and to synchronize the transmit frequency converter 810 to perform a change in the alternative center frequency during said GAP or guard period.
  d. In the case of a frame-based communication protocol, where an empty region (e.g. empty symbol as described above) is placed within the frames, the synchronization detector 840 may be operative to detect said empty region, and to synchronize the transmit frequency converter 810 to perform a change in the alternative center frequency during said empty region.
  e. In the case of a frame-based communication protocol, where a preamble or other known signal is placed within the frame, the synchronization detector 840 may be operative to detect the preamble or other known signal, and to synchronize the transmit frequency converter 810 to perform a change in the alternative center frequency during non-critical regions (e.g. un-important symbol duration as described above).

Optional methods for implementing the add-on apparatus for the Frequency Diversity techniques described above are now described. When using the abovementioned off-the-shelf equipment, especially receiver (e.g. receiver 020), off-the-shelf receiver 020 typically assumes that the center frequency of its transmission is kept fixed, and all the components and algorithms implemented at part of this receiver 020 (e.g. channel estimation, equalization, etc.) are designed for this case (and thus are more optimal for that case). If the center frequency is shifted every time period, the channel, which is assumed fixed by the receiver 020, in fact changes (sometimes dramatically) every time a frequency conversion/shift occurs. To alleviate the fact that this behavior of the channel (that the receiver 020 is not being designed to confront) may affect or degrade the performance of the receiver 020, according to some embodiments of present invention, a Channel Compensation Signal (CCS) may be employed.

The Channel Compensation Signal (CCS) may optionally be generated at the Transmit Frequency Converter (TFC) 620 by a Channel Compensation Signal (CCS) Generator 851. Further optionally, a controller 870 resides in Transmit Frequency Converter (TFC) 620, for controlling the operation of its process. Optionally, the Channel Compensation Signal (CCS) may be generated by an external source. Optionally the Channel Compensation Signal (CCS) Generator 851 generates base-band signal or an intermediate frequency (IF) signal. A Channel Compensation Signal (CCS) Generator 851 generated signal may optionally be predetermined or vary along with time or have a portion which varies, and another portion which is predetermined. Further optionally, the Channel Compensation Signal (CCS) Generator generated signal may optionally be generated by a predetermined algorithm. Alternatively, the Channel Compensation Signal (CCS) Generator 851 may generate a plurality of signals (several signals simultaneously), forming together the Channel Compensation Signal (CCS).

This Channel Compensation Signal (CCS) may be used (typically by the RFC) for several aims, in example:
  1. This Channel Compensation Signal (CCS) may be used for channel estimation of a channel before the main signal is being shifted to it (a-priori channel estimation). In order to enable this, the Channel Compensation Signal (CCS) may optionally be a known signal (as mentioned above) which is known at the Transmit Frequency Converter (TFC) 620 and the Receive Frequency Converter (RFC) 640. This known signal is then used by the Channel Compensation Signal (CCS) Receiver 960 to estimate the channel 025 between the Transmit Frequency Converter (TFC) 620 and the Receive Frequency Converter (RFC) 640.
  2. This Channel Compensation Signal (CCS) may be used for delivering aiding data for the channel compensation between network nodes (e.g. between the Transmit Frequency Converter (TFC) and the Receive Frequency Converter (RFC)). Such aiding data is, for example, known information regarding the channel that is apparent at the Transmit Frequency Converter (TFC), or the next frequency shift (or the next frequency shifts list) that will be executed by the Transmit Frequency Converter (TFC). Another example of such control data is the location within the frame that the frequency shift will occur (such locations/portions are described above with regard to FIGS. 2-5).

The Channel Compensation Signal (CCS) Generator 840 may optionally interface the Synchronization Detector 840 such that relevant inputs from the Synchronization Detector 840 can be provided to the Channel Compensation Signal (CCS) Generator 840. These inputs and information may be, for example, the inputs described in the examples of the operation of the synchronization detector 840 above (such as the inputs from the Synchronization Detector 840 to the transmit frequency converter 810). One typical usage of this interface is to synchronize the transmission of the Channel Compensation Signal (CCS) and the transmission of the main signal.

After generating Channel Compensation Signal (CCS) pre-converted signal at the Channel Compensation Signal (CCS) Generator 840, the Channel Compensation Signal (CCS) pre-converted signal is converted to a Channel Compensation Signal (CCS) desired frequency by the Channel Compensation Signal (CCS) Frequency Converter 850. The frequency shifts of the Channel Compensation Signal (CCS) frequency converter 850 may be optionally the same (frequency shifts list) as the transmit frequency converter shifts (however, there may occur a period of time before they [the frequency shifts of the transmit frequency converter 810] occur by the transmit frequency converter 810, as e.g. described in FIG. 10 below). Further optionally, the frequency shifts of the Channel Compensation Signal (CCS) frequency converter 850 may be optionally different (frequency shifts list) from the transmit frequency converter shifts (e.g. the center frequency of the Channel Compensation Signal (CCS) 855 may be fixed over a period of time, while the center frequency of the signal 815 at the output of the transmit frequency converter 810 changes (is shifted) over this period of time, see for example FIG. 11). Optionally, the frequency shift rate of the Channel Compensation Signal (CCS) Frequency Converter 850 may be different to the shift rate of the Transmit Frequency Converter 810 (it may be faster or slower).

The Channel Compensation Signal (CCS) 855 frequency shifts may optionally be determined by a frequency selector 860. Further optionally, a controller 870 resides in Transmit Frequency Converter (TFC) 620, for controlling the operation of its process. Optionally, the change in the alternative Channel Compensation Signal (CCS) center frequency is made upon several consecutive detections of said predetermined portion. Further optionally, the change in the alternative Channel Compensation Signal (CCS) center frequency is determined by some predefined criteria taking into account the detection of said predetermined portion.

The main signal 815 and the Channel Compensation Signal (CCS) 855 are then summed (by a Summer 820) and then continue to the antenna or any other RF chain element.

Optionally, a bypass signal 611 may be transmitted at the output of the Transmit Frequency Converter (TFC) 620. This bypass signal 611 is the original main signal that is transmitted as well at the output of the Transmit Frequency Converter (TFC) 620, as it is summed (by the summer 820) with the other signals at the output of the Transmit Frequency Converter (TFC) 620.

Figure 9:
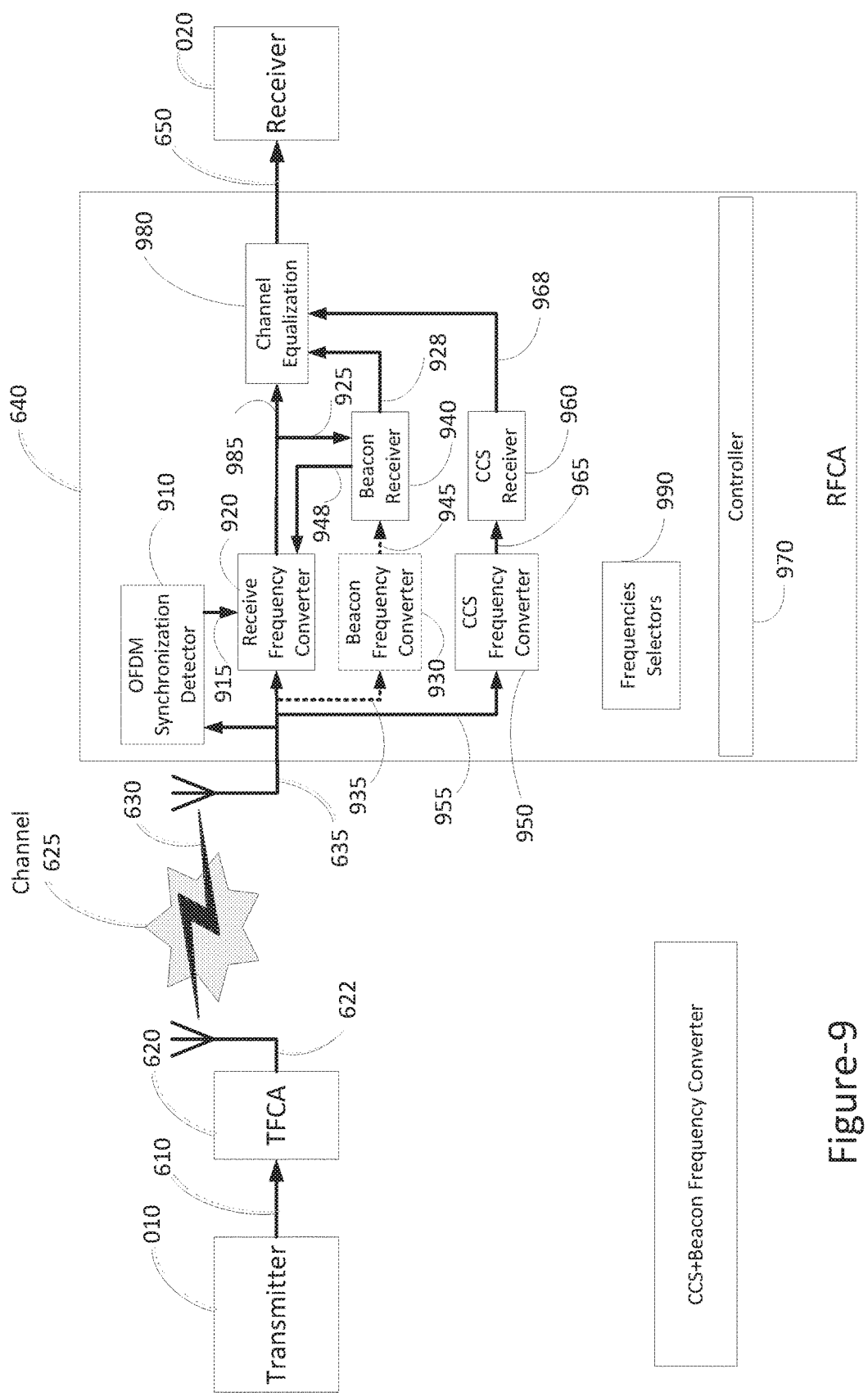
Figure 14:
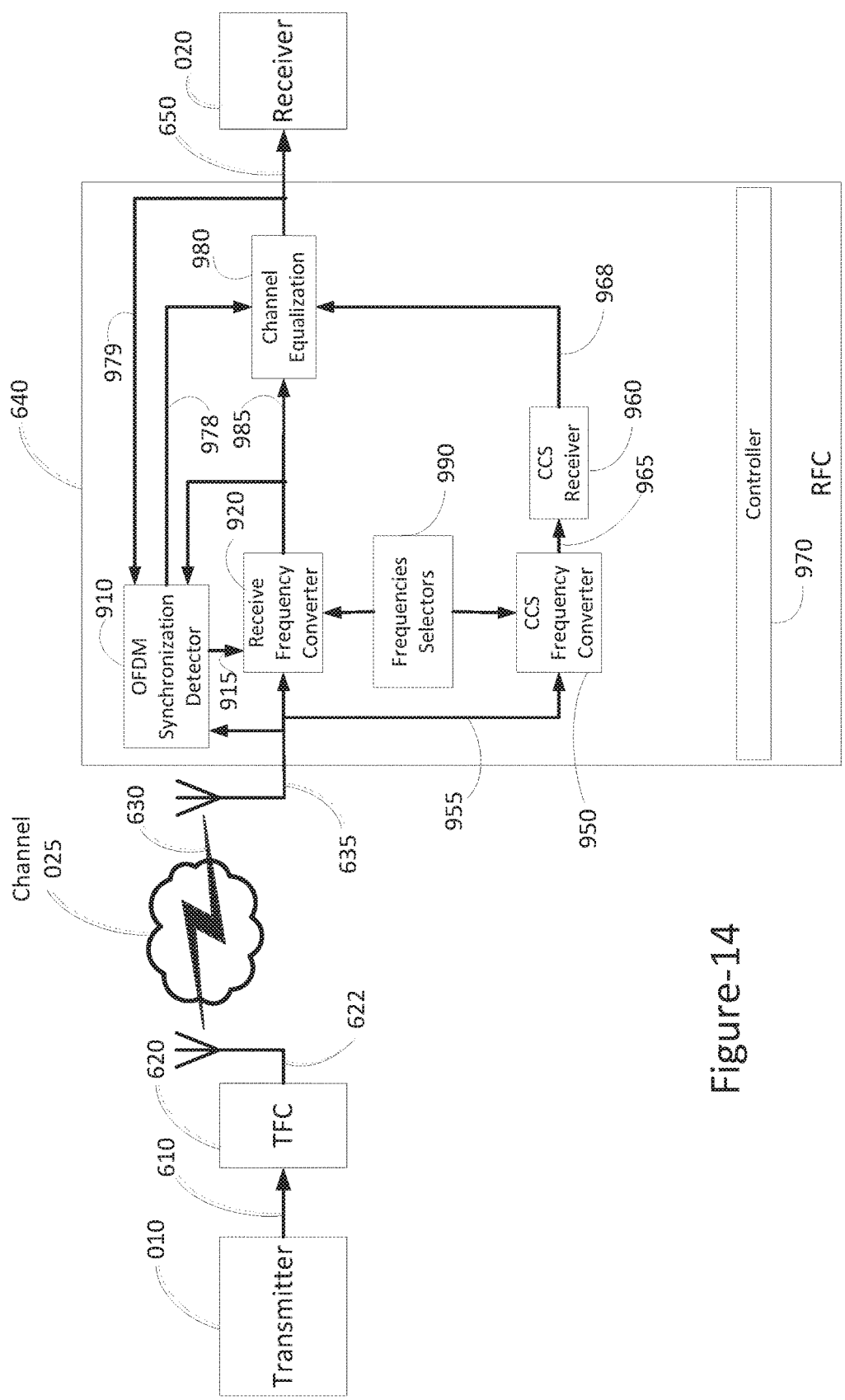
FIG. 14 depicts a block diagram of an example implementation of the Receive Frequency Converter (RFC) portion of the add-on frequency diversity apparatus.

FIG. 14 depicts a more detailed block diagram of an example of the Receive Frequency Converter (RFC) portion of the add-on frequency diversity apparatus, according to a further embodiment of the present invention. In this embodiment, Receive Frequency Converter (RFC) 640 comprises a synchronization detector 910, a receive frequency converter 920, and optionally a frequency selector 990. In the case of an OFDM communication protocol, synchronization detector 910 is an OFDM synchronization detector, as depicted in FIG. 9a, operative to detect predetermined portions of the OFDM signal. Alternatively, in the case of a CDMA communication protocol, synchronization detector 910 is a CDMA synchronization detector, operative to detect predetermined portions of the CDMA signal. Alternatively, according to the communication protocol, synchronization detector 910 is operative to detect predetermined portions of the relevant communication protocol signal.

Typically, synchronization detector 910 is operative to detect predetermined portions of the relevant communication protocol signal in which the frequency conversion/shift may be realized, as described above regarding FIGS. 2-7. Typically, upon detection of said predetermined portion, the synchronization detector 910 synchronizes the receive frequency converter 920 to perform a change in the alternative center frequency, e.g. to perform a change in the active frequency shift. Receive frequency converter 920 is the actual component that performs the frequency conversion. The new alternative center frequency may optionally be determined by a frequencies selector 990. Further optionally, a controller 970 resides in Receive Frequency Converter (RFC) 640, for controlling the operation of its process. Optionally, the change in the alternative center frequency is made upon several consecutive detections of said predetermined portion. Further optionally, the change in the alternative center frequency is determined by some predefined criteria taking into account the detection of said predetermined portion.

Optionally, synchronization detector 910 may use the received signal 635 (e.g. the signal which is received at the alternative center frequency) for the purpose of detection and synchronization. Optionally, synchronization detector 910 may use the signal 650 (e.g. the signal which has the original center frequency) for the purpose of detection and synchronization. Further optionally, synchronization detector 910 may use both signals, 635 and 650.

Optionally and preferably, said predetermined portions of the signal, in which the frequency conversion/shift may be realized, are "non-critical regions" of the transmission, in that improper reception of these portions/regions is not as harmful to the receiver as other (critical) regions. Some examples of such portions/regions are described above regarding FIGS. 2-5, and also hereinbelow.

Some examples of the operation of the synchronization detector 840 are:

a. In the case of a OFDM or OFDMA communication protocol, the synchronization detector 910 may be operative to detect the Cyclic Prefix (CP) of the OFDM/OFDMA symbols, and to synchronize the receive frequency converter 920 to perform a change of the alternative center frequency during the reception of the CP.

b. In the case of a frame-based communication protocol, where a GAP or some guard period is placed between successive frames, the synchronization detector 910 may be operative to detect said GAP or guard period, and to synchronize the receive frequency converter 920 to perform a change of the alternative center frequency during said GAP or guard period.

c. In the case of a TDD communication protocol, where a GAP or some guard period is placed between the uplink subframe and the downlink subframe (or vice versa), the synchronization detector 910 may be operative to detect said GAP or guard period, and to synchronize the receive frequency converter 920 to perform a change of the alternative center frequency during said GAP or guard period.

d. In the case of a frame-based communication protocol, where an empty region (e.g. empty symbol as described above) is placed within the frames, the synchronization detector 910 may be operative to detect said empty region, and to synchronize the receive frequency converter 920 to perform a change of the alternative center frequency during said empty region.

e. In the case of a frame-based communication protocol, where a preamble or other known signal is placed within the frame, the synchronization detector 910 may be operative to detect the preamble or other known signal, and to synchronize the receive frequency converter 920 to perform a change of the alternative center frequency during non-critical regions (e.g. un-important symbol duration as described above).

In order to use the Channel Compensation Signal (CCS) at the Receive Frequency Converter (RFC) 640 for channel compensation, a Channel Compensation Signal (CCS) Frequency Converter 950 is optionally provided as part of the Receive Frequency Converter (RFC) 640. The Channel Compensation Signal (CCS) Frequency Converter 950 is used to re-convert the Channel Compensation Signal (CCS) to a frequency (either intermediate frequency or baseband) that the Channel Compensation Signal (CCS) Receiver 960 can receive.

The Channel Compensation Signal (CCS) Receiver 960 comprises, optionally some or all of the following, suitably coupled e.g. as illustrated: Channel Compensation Signal (CCS) detector, Channel Compensation Signal (CCS) demodulator and channel estimator. The Channel Compensation Signal (CCS) Receiver may be used for channel estimation of the Channel Compensation Signal (CCS) signal. Such channel estimation of Channel Compensation Signal (CCS) signal can enable to adapt the channel of the main signal so that the receiver 020 will receive an improved main signal (with minimal performance/quality degradation due to the frequency diversity capability provided to the main signal, said performance can be for example signal-to-noise ratio [SNR], bit error rate [BER], etc.).

The estimated channel and any other relevant information is delivered 968 to the Channel Equalization engine 980. The Channel Equalization engine 980 uses the estimated channel for the equalization process (there may be an equalizer as part of the Channel Equalization engine 980). Optionally, the Channel Equalization engine inverts the estimated channel so that when the main signal is converted to a certain frequency, the Channel Equalization engine 980 inverts the channel using the (prior) estimated channel at this center frequency. More explanation regarding this process will be described in FIGS. 10 and 12.

The Synchronization Detector 910 may optionally use the output 979 of the Channel Equalization engine 980 in order to improve its operation. The output of the Channel Equalization engine 980 may typically have better signal quality (less degraded signal quality) with respect to the input of the Channel Equalization engine 980.

Further optionally, the Channel Equalization engine 980 may use information 978 provided by the Synchronization Detector 910 to improve its operation (e.g. for better time and frequency synchronization between the re-converted main signal and the equalizer (of the Channel Equalization engine 980).

Figure 10:
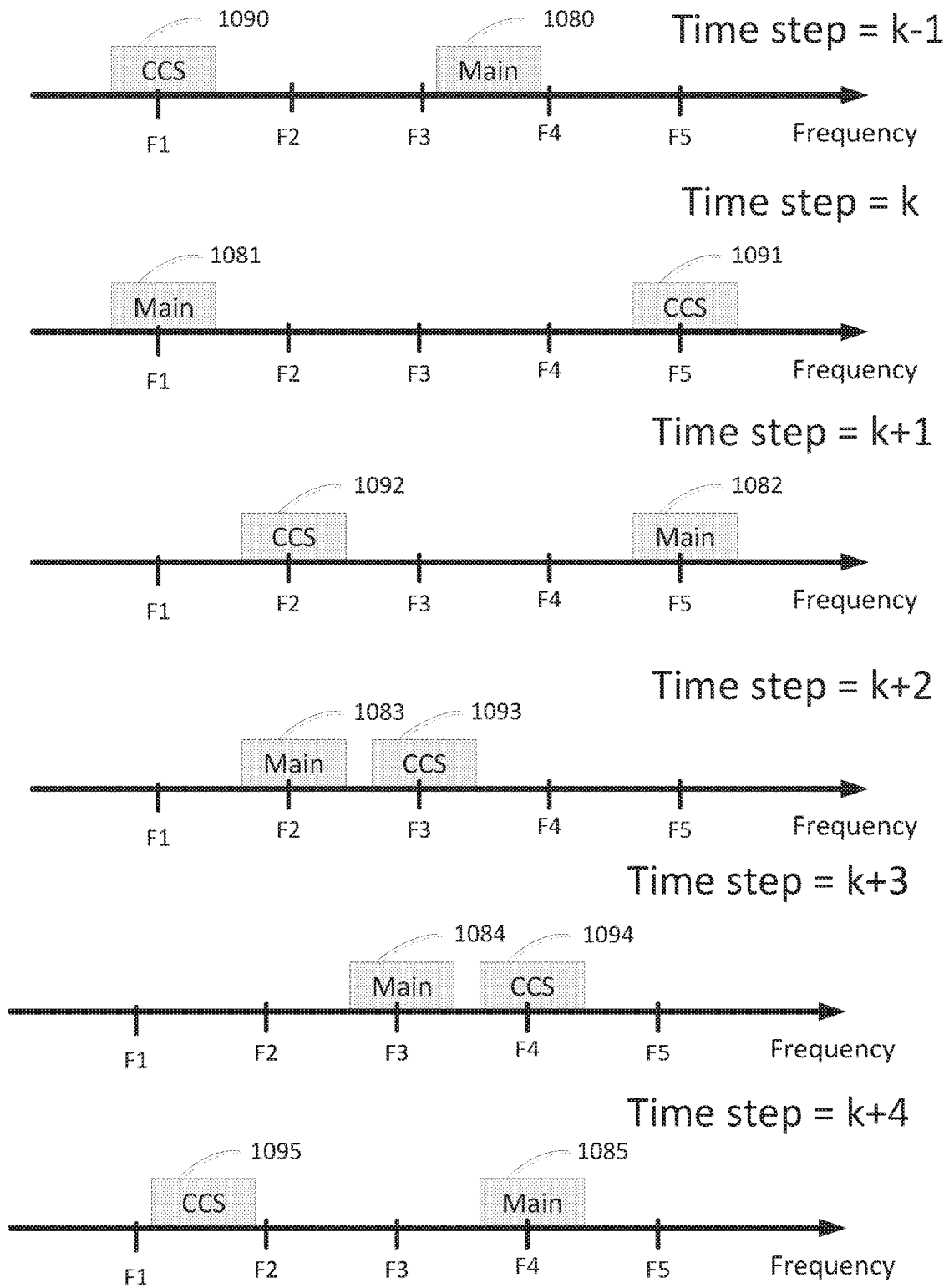
FIG. 10 depicts an example of a flow of operation of the Channel Compensation Signal (CCS) for several sequential time steps, showing a process of changing center frequency of the Channel Compensation Signal (CCS).

FIG. 10 depicts an example of a flow of operation of the Channel Compensation Signal (CCS) for several sequential time steps, showing a process of changing the center frequency of the Channel Compensation Signal (CCS). It can be seen that the Channel Compensation Signal (CCS) is always one step in advance with respect to the main signal. The Channel Compensation Signal (CCS) is located in the frequency domain in specific time step one time step before the main signal. For example, in this figure (FIG. 10) at time step="k" the Channel Compensation Signal (CCS) 1091 is located in frequency F5 whereas the main signal 1081 is located at frequency F1. It can be seen also that in the previous time step, namely time step="k−1", the Channel Compensation Signal (CCS) signal 1090 is located at a frequency F1, which is the frequency of the main signal 1081 at time step="k". The same process continues in the same manner at the following time steps (and is also described in the example flow charts depicted in FIGS. 12a and 12b). Optionally this behavior can be cyclic (if there is a fixed list of frequency shifts of the main signal, and it is executed in a cyclic order, meaning implementing the frequency shift in a sequential order, and that after executing the last frequency shift in the list, the next frequency shift is again the first frequency shift in the list). Optionally, the behavior can be non-cyclic (no cyclic order of frequency shifts) and may be determined according a predetermined algorithm. Optionally, the frequency shifts enable orthogonal coverage of bandwidths of the main or Channel Compensation Signal (CCS) signals, meaning e.g. that there is no overlap of frequencies between all the bandwidths of the main signal and/or the Channel Compensation Signal (CCS) along the different frequency shifts (as can be seen at time steps "k" to time step "k+3"). Optionally the frequency shifts enable non-orthogonal coverage of bandwidths of the main or Channel Compensation Signal (CCS) signals (as can be seen at time steps "k−1" and time step "k+4" with respect to time steps "k" to time step "k+3" because e.g. main signal 1080 at time step "k−1" covers the same frequencies as main signal 1084 of time step "k+3" and main signal 1085 of time step "k+4". Further optionally, the frequency shifts enable a combination of the two frequency shift schemes over time (orthogonal and non-orthogonal).

Figure 11:
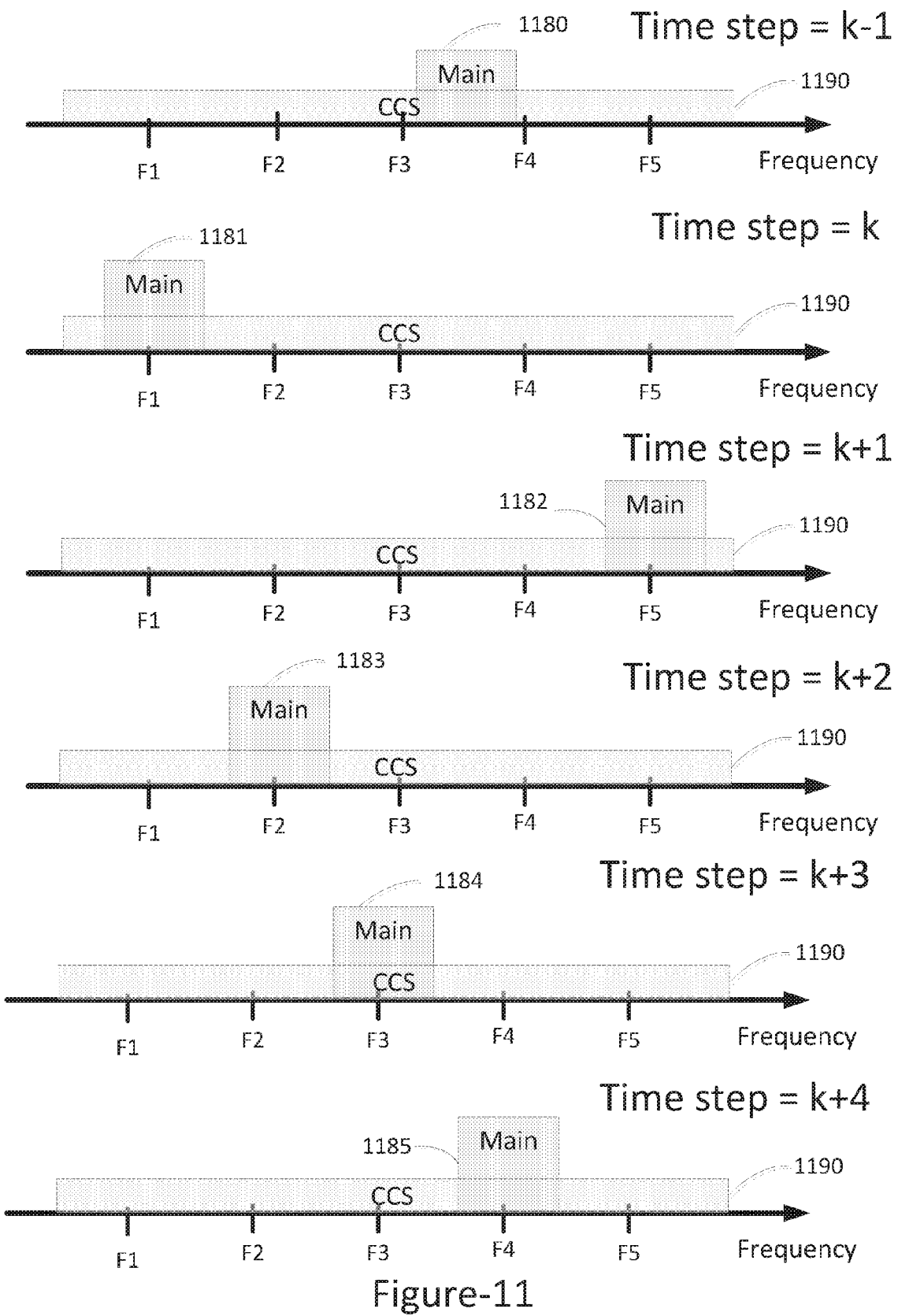
FIG. 11 depicts an example for a flow of operation of the Channel Compensation Signal (CCS) for several sequential time steps, showing a process of fixed center frequency of the Channel Compensation Signal (CCS).

FIG. 11 depicts an example of a flow of operation of the Channel Compensation Signal (CCS) for several sequential time steps, showing a process of fixed center frequency of the Channel Compensation Signal (CCS). The center frequency of the Channel Compensation Signal (CCS) is fixed along the presented period of time (time steps "k−1" to "k+4") while the center frequency of the main signal is changing (is being shifted) along this period of time. In this alternative, all the features regarding the behavior of the frequency shifts of the main signals described at FIG. 10 can be optionally implemented is this case as well.

Figure 12A:
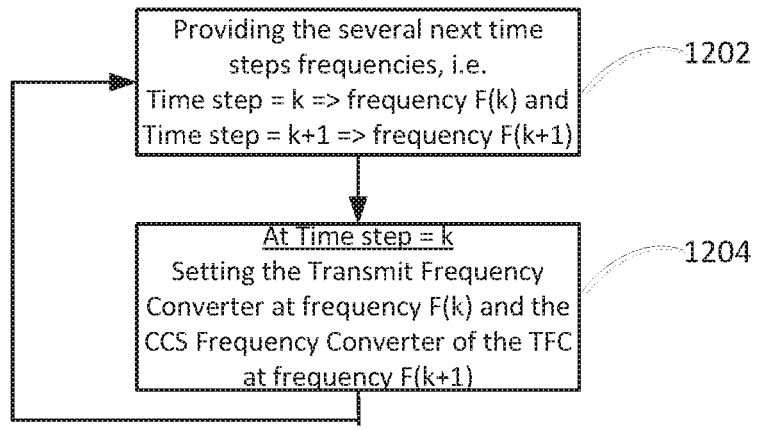
FIG. 12a presents an example of a flow chart for the operation of the Transmit Frequency Converter (TFC)
Figure 12B:
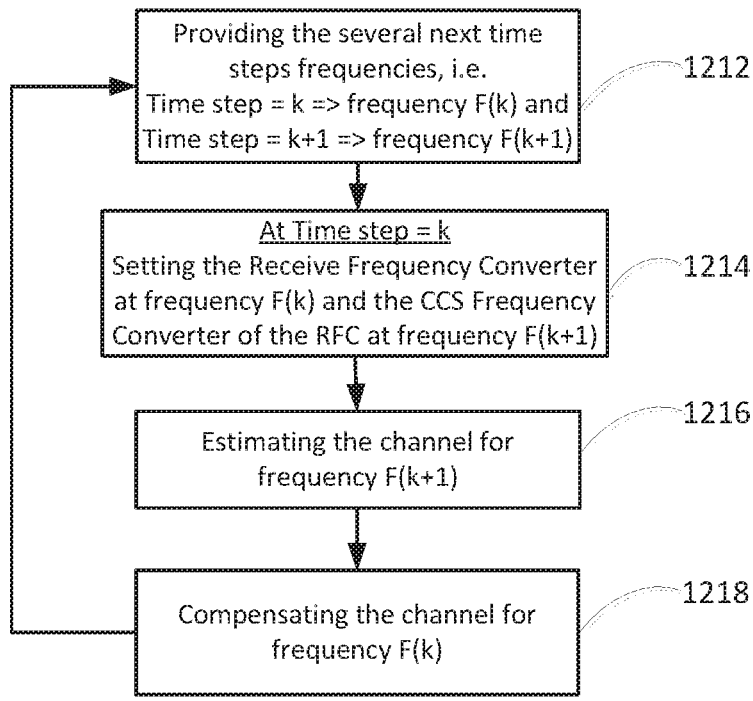
FIG. 12b presents an example of a flow chart for the operation of the Receive Frequency Converter (RFC).

FIG. 12a presents an example of a flow chart for the operation of the Transmit Frequency Converter (TFC). FIG. 12b presents an example of a flow chart for the operation of the Receive Frequency Converter (RFC).

FIG. 12a presents an example of a flow chart for part of the operation of the Transmit Frequency Converter (TFC), for a Channel Compensation Signal (CCS) whose center frequency changes over time. e.g. as described regarding FIG. 13, several frequencies for the frequency shifts (for some of the next time steps) may be provided (in advance) 1202 to the Transmit Frequency Converter (TFC) or to the Transmit Frequency Converter (TFC) components such as (in this example) its frequency converters (e.g. transmit frequency converter and Channel Compensation Signal (CCS) frequency converter). In one example, frequencies for two time steps are provided to the frequency converters: for time step="k" the alternative frequency is determined to be frequency "F(k)" and for time step="k+1" the alternative frequency is determined to be frequency "F(k+1)". In this example, at time step="k" 1204, after providing those several frequencies 1202, the frequency converters of the Transmit Frequency Converter (TFC) are set accordingly (e.g.): the transmit frequency converter is set at frequency "F(k)" and the Channel Compensation Signal (CCS) frequency converter is set at frequency "F(k+1)".

FIG. 12b presents an example of a flow chart for the operation of the Receive Frequency Converter (RFC), for a Channel Compensation Signal (CCS) whose center frequency changes over time. It is proposed that, as described regarding FIG. 13, several frequencies for the frequency shifts (for some of the next time steps) are provided (in advance) 1212 to the Receive Frequency Converter (RFC) or to the Receive Frequency Converter (RFC) components such as (in this example) its frequency converters (e.g. receive frequency converter and Channel Compensation Signal (CCS) frequency converter). In one example, two time step frequencies are provided to the frequency converters: for time step="k" the alternative frequency is determined to be frequency "F(k)" and for time step="k+1" the alternative frequency is determined to be frequency "F(k+

1)". In this example, at time step="k" 1214, after providing those several frequencies 1212, the frequency converters of the Receive Frequency Converter (RFC) are set accordingly (e.g.): the receive frequency converter is set at frequency "F(k)" and the Channel Compensation Signal (CCS) frequency converter is set at frequency "F(k+1)". The two next flow blocks can be in the presented order or in parallel or in opposite order. In flow block 1216 the Channel Compensation Signal (CCS) receiver estimates the channel for frequency "F(k+1)". In flow block 1218 the channel of frequency "F(k)" is compensated e.g. by the Channel Equalization block 980 of FIG. 14.

In the above flowcharts and all such diagrams herein, any or all of the operations represented may be provided, suitably ordered e.g. as shown.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution may include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A communication system comprising:
   at least one communication network node having a capacity for communicating with at least one additional communication network node at a given center frequency and according to a given communication protocol; and
   at least one external frequency converter, external to said node, said converter shifting the transmitted signal of said at least one network node from said given center frequency to a first alternative center frequency, thereby defining a first frequency change, said first alternative center frequency being changed from time to time, thereby defining n frequency changes and n alternative center frequencies to be used on the n frequency changes, respectively, during the communication between said at least one communication network node and said at least one additional communication network node, wherein said external frequency converter is operative to transmit, in addition to the transmission according to said communication protocol at said first alternative center frequency, a signal at a second alternative center frequency, wherein said second alternative center frequency is equal to an alternative center frequency from among said n alternative center frequencies, to be used on a frequency change from among said n frequency changes subsequent to said first frequency change; and wherein n is an integer.

2. The communication system according to claim 1, wherein the channel compensation carries information of the frequency to be used when an upcoming frequency change occurs.

3. The communication system according to claim 1, wherein said external frequency converter comprises a channel compensation signal generator operative to generate said channel compensation signal.

4. The communication system according to claim 1, wherein said channel compensation signal is a band limited White Gaussian Noise (WGN) signal.

5. The communication system according to claim 1, wherein said external frequency converter comprises a synchronization detector, operative to detect a predetermined portion of the signal of said communication protocol, and to synchronize said change in said first and second alternative center frequencies during said detected portion of the signal.

6. The communication system according to claim 5, wherein said predetermined portion is a Cyclic Prefix of an orthogonal frequency-division multiplexing (OFDM) symbol.

7. The communication system according to claim 5, wherein said predetermined portion is a Cyclic Prefix of an orthogonal frequency-division multiple access (OFDMA) symbol.

8. The communication system according to claim 5, wherein said communication protocol is a time division duplex (TDD) protocol, and wherein said predetermined portion is a gap between an uplink subframe and a downlink subframe of said communication protocol.

9. The communication system according to claim 1, wherein the channel compensation signal spans over several future instances of the first alternative center frequency thus constitutes a wideband signal.

10. The communication system according to claim 1, wherein the channel compensation signal is supplied to the external frequency converter from an external system.

11. The communication system according to claim 1, wherein the capacity for communicating comprises a transmitting capacity and wherein the converter comprises a Tx frequency converter.

12. The communication system according to claim 1, wherein the capacity for communicating comprises a receiving capacity and wherein the converter comprises an Rx frequency converter.

13. The communication system according to claim 1, wherein the channel compensation signal is transmitted only during partial intervals of the transmission of the communication protocol.

14. A communication system operative for transmitting a channel compensation signal that is wideband over all frequencies, the communication system comprising:

at least one communication network node having a capacity for communicating with at least one additional communication network node at a given center frequency and according to a given communication protocol; and at least one external frequency converter, external to said node, said converter shifting the transmitted signal of said at least one network node from said given center frequency to a first alternative center frequency, said first alternative center frequency being changed from time to time during the communication between said at least one communication network node and said at least one additional communication network node, wherein said external frequency converter is operative to transmit a signal at a second alternative center frequency, in addition to the transmission of said communication protocol at said first alternative center frequency, wherein said second alternative center frequency is a predetermined frequency, and wherein said channel compensation signal has a bandwidth which spans over the frequencies of at least a multiple of said first alternative center frequencies as changed along the time.

15. The communication system according to claim 14, wherein said channel compensation signal bandwidth spans over all the possible frequencies of said changing first alternative center frequency.

16. The communication system according to claim 14, wherein the channel compensation carries information of the frequency to be used when an upcoming frequency change occurs.

17. The communication system according to claim 14, wherein said external frequency converter comprises a channel compensation signal generator operative to generate said channel compensation signal.

18. The communication system according to claim 14, wherein said channel compensation signal is a band limited White Gaussian Noise (WGN) signal.

19. The communication system according to claim 14, wherein said external frequency converter comprises a synchronization detector, operative to detect a predetermined portion of the signal of said communication protocol, and to synchronize said change in said first and second alternative center frequencies during said detected portion of the signal.

20. The communication system according to claim 19, wherein said predetermined portion is a Cyclic Prefix of an orthogonal frequency-division multiplexing (OFDM) symbol.

21. The communication system according to claim 19, wherein said predetermined portion is a Cyclic Prefix of an orthogonal frequency-division multiple access (OFDMA) symbol.

22. The communication system according to claim 19, wherein said communication protocol is a time division duplex (TDD) protocol, and wherein said predetermined portion is a gap between an uplink subframe and a downlink subframe of said communication protocol.

23. The communication system according to claim 14, wherein the channel compensation signal spans over only partial frequency bandwidth as of the communication protocol.

24. The communication system according to claim 14, wherein the predetermined portion is a gap between successive frames of the communication protocol.

25. The communication system according to claim 14, wherein the channel compensation signal bandwidth spans over the frequencies of at least a multiple of the first alternative center frequencies as changed along the time.

26. The communication system according to claim 14, wherein said channel compensation signal defines a channel and also including a channel equalization block which equalizes the channel based on measurements made by the receiver based on the channel compensation signal.

27. A wireless communication method comprising:
providing at least one wireless communication network node having a capacity for communicating with at least one additional wireless communication network node at a given center frequency and according to a given wireless communication protocol; and
providing at least one external frequency converter, external to said node, said converter shifting a received signal, received at a receiver, of said at least one wireless network node from a first alternative center frequency to said given center frequency, said first alternative center frequency being changed from time to time during the communication between said at least one wireless communication network node and said at least one additional wireless communication network node,
wherein said external frequency converter is operative to receive a signal at a second alternative center frequency, and
wherein said second alternative center frequency is equal to the first alternative center frequency to be used on the next frequency change.

28. A communication method operative for receiving a channel compensation signal which is wideband over all frequencies, the method comprising:
providing at least one communication network node having a capacity for communicating with at least one additional communication network node at a given center frequency and according to a given communication protocol, and at least one external frequency converter, external to said node, said converter shifting the transmitted signal of said at least one network node from a first alternative center frequency to said given alternative center frequency, said first alternative center frequency being changed from time to time during the communication between said at least one communication network node and said at least one additional communication network node,
wherein said external frequency converter is operative to receive a signal at a second alternative center frequency, and
wherein said channel compensation signal bandwidth spans over the frequencies of at least a multiple of said first alternative center frequencies as changed along the time.

* * * * *